(12) United States Patent
Riggsby

(10) Patent No.: US 8,397,271 B2
(45) Date of Patent: Mar. 12, 2013

(54) POWER DIVIDER NETWORKS FOR CABLE TELEVISION NETWORKS THAT INCLUDE MULTIMEDIA OVER COAX BYPASS CIRCUITS AND SIGNAL AMPLIFIERS THAT INCLUDE SUCH POWER DIVIDER NETWORKS

(75) Inventor: Robert Ryan Riggsby, Hickory, NC (US)

(73) Assignee: CommScope, Inc. of North Carolina, Hickory, NC (US)

( * ) Notice: Subject to any disclaimer, the term of this patent is extended or adjusted under 35 U.S.C. 154(b) by 671 days.

(21) Appl. No.: 12/510,351

(22) Filed: Jul. 28, 2009

(65) Prior Publication Data
US 2010/0162340 A1 Jun. 24, 2010

Related U.S. Application Data

(60) Provisional application No. 61/138,671, filed on Dec. 18, 2008.

(51) Int. Cl.
*H04N 7/16* (2011.01)
(52) U.S. Cl. ............................ 725/149; 725/143; 725/148
(58) Field of Classification Search ................. 725/78, 725/126, 127, 143, 148, 149
See application file for complete search history.

(56) References Cited

U.S. PATENT DOCUMENTS

| | | | |
|---|---|---|---|
| 7,530,091 B2 | 5/2009 | Vaughan | |
| 7,936,701 B2 * | 5/2011 | Lee et al. | 370/254 |
| 2002/0166124 A1 | 11/2002 | Gurantz et al. | |
| 2005/0289632 A1 | 12/2005 | Brooks et al. | |
| 2007/0061854 A1 * | 3/2007 | Albag et al. | 725/95 |
| 2009/0047917 A1 | 2/2009 | Phillips et al. | |
| 2010/0100918 A1 * | 4/2010 | Egan et al. | 725/111 |

OTHER PUBLICATIONS

Powerpoint Slides, SCTE IPS—Multimedia Over Coax Alliance MoCA Splitter and amplifier implications, Prepared by Paul D. Brooks, Apr. 22, 2009.

* cited by examiner

*Primary Examiner* — John Schnurr
(74) *Attorney, Agent, or Firm* — Myers Bigel Sibley & Sajovec

(57) ABSTRACT

RF signal amplifiers for cable television networks are provided that include an RF input port, a power amplifier coupled to the RF input port and a power divider having an input that is coupled to an output of the power amplifier. The power divider includes a first directional coupler that is coupled to an output of the power amplifier. The directional coupler includes a first output branch and a second output branch. A first bypass circuit is coupled between the first and second output branches of the first directional coupler. A response of the power divider includes a null that substantially blocks signals received at the input of the power divider from passing to outputs of the power divider in a subset of frequencies within the range of 5 MHz to 1550 MHz. These RF signal amplifiers may provide improved performance, robustness and reliability when used in MOCA networks.

22 Claims, 15 Drawing Sheets

-4 dB + -4 dB + -10 dB + -4 dB + -4 dB = -26 dB

-4 dB + -4 dB + -25 dB + -4 dB + -4 dB = -41 dB

POWER DIVIDER NETWORKS FOR CABLE TELEVISION NETWORKS THAT INCLUDE MULTIMEDIA OVER COAX BYPASS CIRCUITS AND SIGNAL AMPLIFIERS THAT INCLUDE SUCH POWER DIVIDER NETWORKS

CROSS-REFERENCE TO RELATED APPLICATION

The present application claims priority under 35 U.S.C. §119(e) to U.S. Provisional Patent Application Ser. No. 61/138,671, filed Dec. 18, 2008, the content of which is incorporated herein by reference as if set forth in its entirety.

FIELD OF THE INVENTION

The present invention generally relates to cable television networks and, more particularly, to power divider networks and signal amplifiers for cable television networks.

BACKGROUND

Cable television networks refer to communications networks that are used to transmit cable television signals and/or other information between one or more service providers and a plurality of subscribers over coaxial cables and/or fiber optic cables. Most conventional cable television networks comprise a completely fiber optic network (i.e. RFoG), a completely coaxial cable network or, most typically, a hybrid fiber-coaxial ("HFC") network. In these hybrid networks, fiber optic cables are typically used to carry signals from the headend facilities of the service provider to various distribution points, while less expensive coaxial cable may be used, for example, to carry the signals into neighborhoods and/or into individual homes or other premises.

Typically, the service provider is a cable television company that may have exclusive rights to offer cable television services in a particular geographic area. The subscribers in a cable television network may include, for example, individual homes, apartments, hotels and other multi-dwelling units ("MDU"), businesses, and various other premises. The service provider may broadcast a broad variety of cable television channels to subscriber premises over the cable television network. In addition, the service provider may offer subscribers a variety of additional services such as, for example, movies-on-demand, broadband Internet service and/or digital telephone service that are provided via a single radio frequency ("RF") connection over the cable television network.

Typically, downstream signals that are transmitted by a cable service provider to subscriber premises are carried in the 54-1002 MHz frequency band. These downstream signals may include, for example, the different tiers of cable television channels, movies on demand, digital telephone and/or Internet service (the signals received by the subscriber), and other broadcast or point-to-point offerings. The "upstream" signals from subscribers to the cable service provider are typically transmitted in the 5-42 MHz frequency band. These upstream signals may include, for example, digital telephone and/or Internet service (the signals transmitted by the subscriber) and ordering commands (i.e., for movies-on-demand and other services).

The RF signal from the service provider that is received at a typical subscriber premises may be on the order of approximately +5 dBmV/channel. This received RF signal may require amplification by an RF amplifier in order to properly service the various communication ports maintained by the subscriber. This amplification is typically provided by a signal amplifier that may be located, for example, at the service provider-subscriber demarcation point. The signal amplifier may comprise a forward path signal amplifier (i.e., an amplifier that amplifies signals from the service provider to the subscriber) and, in some cases, a second reverse path amplifier (i.e., an amplifier that amplifies signals from the subscriber to the service provider). These forward and reverse path amplifiers are typically coupled to a power divider network that divides the output of the forward path amplifier into multiple outputs and which combines multiple inputs from the subscriber premises (if any) into a single signal that is fed to the reverse path amplifier. The multiple outputs of the power divider network may be connected to coaxial cables that carry the signal from the service provider to various wall outlets throughout the subscriber premises. The subscriber may then connect televisions, cable modems, Internet phones and the like to these wall outlets.

An open, industry-driven initiative is ongoing that promotes the distribution of digital video and other multi-media entertainment content through the existing coaxial cable "network" that runs through most homes and other premises. An industry alliance known as the Multi-media Over Coax Alliance ("MOCA") is in the process of developing standards which will specify frequency bands, interfaces and other parameters that will allow equipment from different standards-compliant vendors to be used to distribute multi-media content over in-home coaxial cable networks. Currently, MOCA content is to be carried through in-home coaxial cable networks in the 850 MHz to 1550 MHz frequency band, although since standard cable television signals are distributed at frequencies up to 1002 MHz, many cable television service providers have chosen to distribute MOCA content within a narrower frequency band that is above the cable television band, such as, for example, frequencies of 1150 MHz to 1550 MHz. Examples of MOCA content that may be distributed over an in-home coaxial cable network are digital television, video-on-demand programming and digitally-recorded television or music programming. In an exemplary application of MOCA, such programming may be transmitted via the coaxial cables that run through the walls of a home from a primary set-top box (which may be a relatively expensive, full service set top box having a digital television receiver, DVR and/or video-on-demand capabilities, etc.) to less capable, less expensive satellite set-top boxes that are installed on other televisions throughout the premises. In this manner, the full capabilities of the primary set top box may be enjoyed at all of the televisions within the residence without having to provide a primary set top box for each television.

SUMMARY

Pursuant to embodiments of the present invention, RF signal amplifiers for cable television networks are provided that include an RF input port and a power amplifier coupled to the RF input port. A power divider is provided that has an input that is coupled to an output of the power amplifier and first and second outputs. The power divider includes a first directional coupler that has a first output branch and a second output branch. A first bypass circuit is coupled between the first and second outputs of the first directional coupler. A response of the power divider includes a null that substantially blocks signals received at the input of the power divider from passing to the first or second outputs of the power divider in a contiguous subset of frequencies within the range of 5 MHz to 1550 MHz. In some embodiments, the center frequency of the null is located in between 870 MHz and 1150 MHz. In other embodiments, the center frequency of the null is located in between 1002 MHz and 1100 MHz.

The first bypass circuit may comprise a bandpass filter or a high pass filter that is configured to pass signals in the 1150 MHz to 1550 MHz frequency band. In some embodiments, the power divider may include an isolation circuit between the first output and the second output of the power divider that is configured to block signals in the 5 MHz to 1002 MHz frequency band. The power divider may further includes a second directional coupler that is coupled to the first output branch of the first directional coupler and a third directional coupler that is coupled to the second output branch of the first directional coupler. In such embodiments, a second bandpass or high pass filter may be coupled between the output branches of the second directional coupler and a third bandpass or high pass filter may be coupled between the outputs branches of the third directional coupler.

In some embodiments, the power amplifier may be part of a first communication path between the RF input port and the power divider. A second non-amplified, non-interruptible communication path may also be provided between the RF input port and a separate RF output port. The RF signal amplifier may also include a power input for receiving electrical power and a selective termination circuit that is configured to pass signals between the RF input port and a plurality of RF output ports over the first communication path when electrical power is received at the power input, and that is further configured to terminate the first communication path to a matched termination when an electrical power feed to the power input is interrupted. The selective termination circuit may comprise a relay, where a first output terminal of the relay is coupled to the power amplifier and a second output terminal of the relay is connected to a resistor that is terminated to a ground voltage. The RF signal amplifier may also include a directional coupler between the RF input port and an input terminal of the relay. This directional coupler may be used to divide an input signal between the first and second communications paths.

Pursuant to further embodiments of the present invention, RF signal amplifiers for cable television networks are provided that include an RF input port and a power amplifier that is coupled to the RF input port. These RF signal amplifiers further include a power divider network. The power divider network includes a first directional coupler that is coupled to an output of the power amplifier, and a filter that is coupled between the outputs of the first directional coupler. The filter is configured to block signals in the 5 MHz to 1002 MHz frequency band and to pass signals in at least the 1150 MHz to 1550 MHz frequency band. The power divider network blocks signals in at least a portion of the 870 MHz to 1150 MHz frequency band.

Pursuant to still further embodiments of the present invention, RF signal amplifiers for cable television networks are provided that include an RF input port and a power amplifier that is coupled to the RF input port. A power divider network that includes at least a first directional coupler that is coupled to an output of the power amplifier, a second directional coupler and a third directional coupler is provided. Moreover, a first filter is coupled between a first output and a second output of one of the first, second or third directional couplers. The first filter is configured to block signals in the 5 MHz to 1002 MHz frequency band and to pass signals in at least the 1150 MHz to 1550 MHz frequency band.

Pursuant to still additional embodiments of the present invention, RF power divider networks are provided that include an RF input port and a first directional coupler that is coupled to the RF input port. The first directional coupler includes a first output and a second output, and an isolation circuit is provided between these outputs that is configured to block signals in the 5 MHz to 1002 MHz frequency band. A first bypass circuit is likewise coupled between the first and second outputs of the first directional coupler that comprises a first filter that is configured to pass signals in the 1150 MHz to 1550 MHz frequency band.

DETAILED DESCRIPTION

Figure 1:
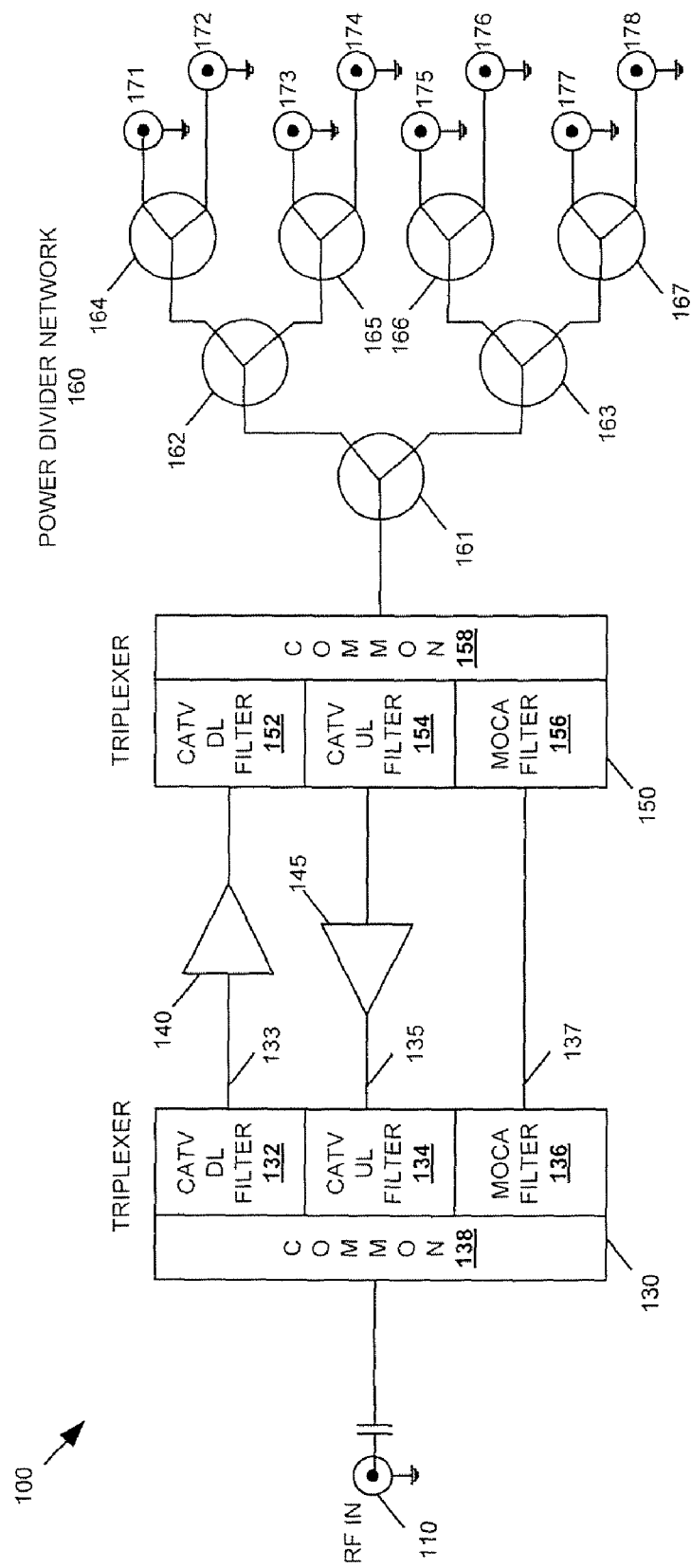
FIG. 1 is a block diagram of a bi-directional RF signal amplifier for a cable television network that is capable of passing MOCA signals.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements and/or components, but do not preclude the presence or addition of one or more other features, operations, elements, components and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this disclosure and the relevant art and will not be interpreted in an idealized or overly formal sense unless expressly so defined herein.

As will be discussed herein, certain embodiments of the present invention include one or more directional couplers. Herein, the term "directional coupler" is used to refer to any device that splits an RF signal received at a first "input" port into two signals that are passed through second and third "output" ports, and which combines signals received at the second and third output ports and passes them through to the first input port (i.e. the directional coupler operates as a combiner). The directional coupler may generally equally split the signal received at the first input port when passing that signal to the second and third output ports (i.e., the directional coupler operates as a splitter), or may unequally split the signal so that the second output port receives more signal energy than the third output port, or vice versa. It will also be appreciated that a directional coupler may have more than one input port and/or more than two output ports. Herein the terms "power divider" and "power divider network" are used to refer to circuitry that divides the power of a signal received at an input between at least two outputs and/or which combines signals received at the outputs and passes the combined signal through the input. The power dividers and power divider networks disclosed herein typically include one or more directional couplers, and may also include other circuitry such as, for example bypass circuits.

Pursuant to embodiments of the present invention, both power divider networks and multi-output RF signal amplifiers that include power divider networks are provided. The power dividers each include one or more MOCA bypass circuits. The MOCA bypass circuits may provide low-loss bypass paths through the power divider network that can be used to transmit MOCA signals while maintaining a high degree of signal isolation in the cable television network frequency band between the outputs of each directional coupler in the power divider network. The power divider networks and RF signal amplifiers according to embodiments of the present invention that are disclosed herein may provide improved performance and reliability with respect to MOCA signals transmitted therethrough. Moreover, the power divider networks and RF signal amplifiers according to embodiments of the present invention can pass cable television signals between a service provider and subscriber premises over the entire CATV frequency band.

FIG. 1 is a block diagram of a bi-directional RF signal amplifier 100 that may be used at a premises which is provided with MOCA capabilities. Amplifier 100 includes a bi-directional RF input port 110 that is configured to receive RF signals from a service provider. RF input port 110 can also pass output signals in the reverse direction from the amplifier 100 through the port 110 to the service provider. A plurality of bi-directional output ports 171-178 are provided for passing RF signals from the amplifier 100 to one or more devices that are in communication with these output ports 171-178, and vice versa.

Signals received through input port 110 are passed to a triplexer 130. A common input 138 to the triplexer 130 receives the signal from the RF input port 110 and passes the signal to a bank of filters 132, 134, 136. The filter 132 is a CATV downstream filter that passes signals in the 54 MHz to 1002 MHz frequency band (i.e., the frequency band used to carry the downstream signals from the CATV service provider to each subscriber premises) that are received from the RF input port 110 to an output 133 of CATV downstream filter 132. The CATV downstream filter 132 does not pass any low frequency (less than about 50 MHz) and/or MOCA signals that are received by triplexer 130 in the reverse direction. The filter 134 is a CATV upstream filter that passes signals in the 5 MHz to 42 MHz frequency band (i.e., the frequency band used to carry the upstream signals from a subscriber premises to the CATV service provider) that are received in the reverse direction through an input 135 of CATV upstream filter 134. The CATV upstream filter 134 does not pass signals in the CATV downstream frequency band (54-1002 MHz) and/or signals in the MOCA frequency band. Finally, a MOCA filter 136 passes signals in, for example, the 1150 MHz to 1550 MHz frequency band (i.e., the frequency band that is typically used for MOCA signals) that are received either from the RF input port 110 or that are received in the reverse direction through an input 137 of the MOCA filter 136, while blocking signals at lower frequencies.

As is further shown in FIG. 1, the downstream CATV signals that are passed through the CATV downstream filter 132 are amplified by a power amplifier 140 and passed to another CATV downstream filter 152 that is part of a second triplexer 150. A second power amplifier 145 is provided that receives signals passed through another CATV upstream filter 154 that is part of the second triplexer 150 and amplifies those signals before passing them to the input 135 of the CATV upstream filter 134 of triplexer 130. The triplexer 150 also includes a MOCA filter 156 which is coupled to the MOCA filter 136 of triplexer 130. A common output 158 of triplexer 150 combines the signals passed through CATV DS filter 152 and MOCA filter 156 and passes those signals out to a power divider network 160.

As shown in FIG. 1, the power divider network 160 may comprise a cascade of directional couplers 161-167 which split a signal received at an input to the power divider network (i.e., the signal received at the input port of directional coupler 161) into eight signals that are fed to respective ones of eight output ports 171-178.

Turning now to the reverse signal flow, signals received by the amplifier 100 from end devices in communication with the RF output ports 171-178 are combined into a composite reverse path signal by the power divider network 160 and passed to the common side 158 of the triplexer 150. This composite reverse path signal is then fed to the bank of filters 152, 154, 156. The filter 154 passes the upstream signals in the 5 MHz to 42 MHz frequency band received from the end devices at the subscriber premises to the power amplifier 145. Likewise, the MOCA filter 156 passes any upstream MOCA signals in the 1150 MHz to 1550 MHz frequency band that are received from the end devices at the subscriber premises to the MOCA filter 136 of triplexer 130. The upstream CATV signals fed through power amplifier 145 and any upstream MOCA signals are combined in the triplexer 130 and passed to RF input port 110 for output to a service provider.

Figure 2:
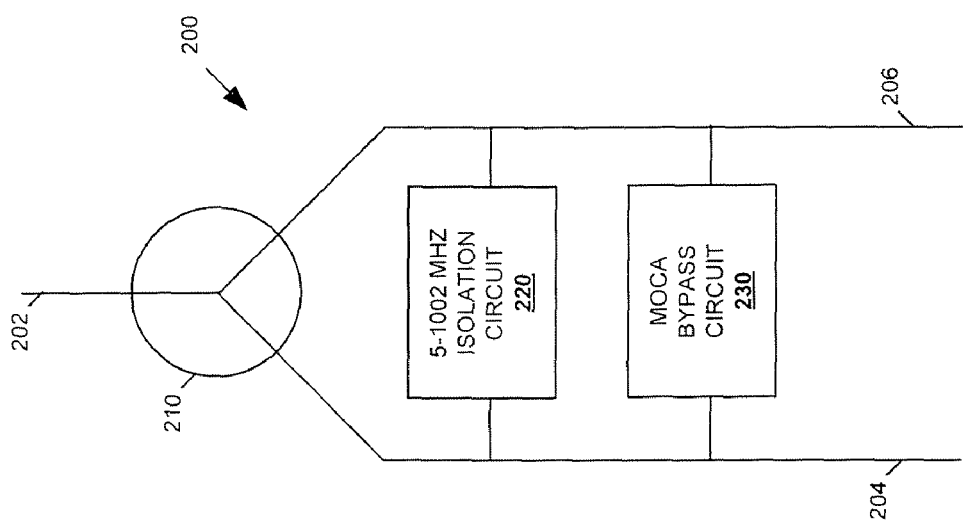
FIG. 2 is a schematic diagram of a power divider network that includes a MOCA bypass circuit according to embodiments of the present invention.

FIG. 2 is a schematic diagram of a power divider network 200 that includes a MOCA bypass circuit according to embodiments of the present invention. As shown in FIG. 2, the power divider network 200 has an input 202 and first and second outputs 204, 206. The power divider network 200 further includes a directional coupler 210 that is coupled between the input 202 and the outputs 204, 206. In addition, the power divider network 200 includes an isolation circuit 220 and a MOCA bypass circuit 230.

The isolation circuit 220 is configured to provide a high degree of isolation between the first output 204 and the second output 206 in the standard cable television network operating band (i.e., between about 5 MHz and about 1002 MHz). By way of example, the isolation circuit 220 may be designed to provide at least 25 dB of isolation between the outputs 204, 206 of the directional coupler 200 in the 5-1002 MHz frequency band. This isolation may help ensure, for example, that a signal transmitted in the reverse direction (i.e., from output to input) on output 204 does not interfere with data transmissions on output 206, and/or if output 204 is left un-terminated in the premises, that signals transmitted between 202 and 206 are less likely to be compromised. In some embodiments, the isolation circuit 220 and the directional coupler 210 may be implemented as a single circuit. In other embodiments, the isolation circuit 220 and the directional coupler 210 may be implemented as separate circuits.

The MOCA bypass circuit 230 is designed to pass signals in at least the 1150 MHz to 1550 MHz MOCA frequency band between the first output 204 and the second output 206. In some embodiments, the MOCA bypass circuit 230 may comprise a MOCA bandpass or high pass filter circuit 230. It will be appreciated that a bypass circuit such as circuit 230 will typically have some level of loss associated with it, such as a loss of, for example, 2-10 dB. However, this loss is a small fraction of the attenuation provided by the isolation circuit 220 (which loss typically exceeds 25 dB), and hence the MOCA bypass circuit is considered to "pass" signals in the 1150 MHz to 1550 MHz MOCA frequency band, while the isolation circuit 220 is considered to "block" signals in the standard cable television network operating band. In some embodiments, the MOCA bypass circuit 230 and the directional coupler 210 may be implemented as a single circuit. In other embodiments, the MOCA bypass circuit 230 and the directional coupler 210 may be implemented as separate circuits.

Figure 3:
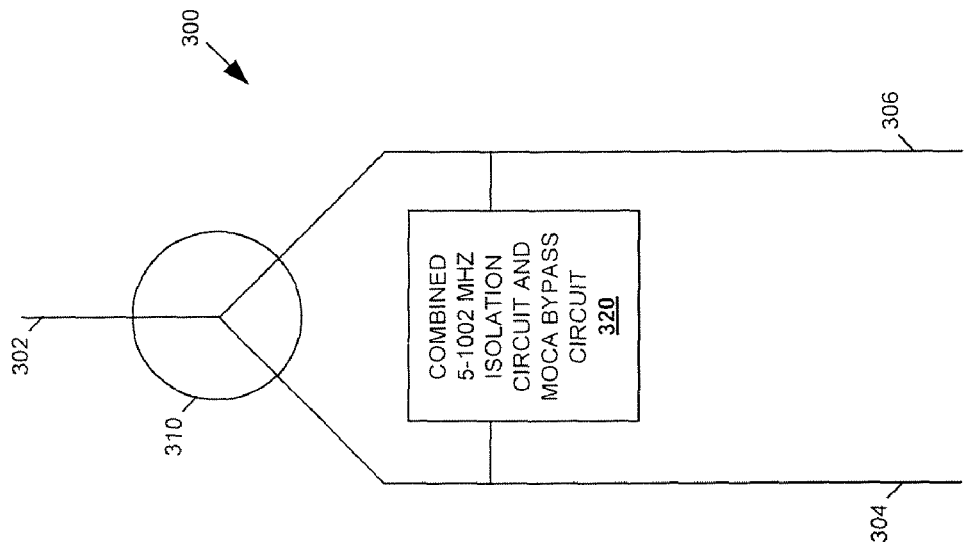
FIG. 3 is a schematic diagram of a power divider network that includes a MOCA bypass circuit according to further embodiments of the present invention.

FIG. 3 is a schematic diagram of a power divider network 300 that includes a MOCA bypass circuit according to further embodiments of the present invention. As shown in FIG. 3, the power divider network 300 has an input 302 and first and second outputs 304, 306. The power divider network 300 further includes a directional coupler 310 that is coupled between the input 302 and the outputs 304, 306. In addition, the power divider network 300 includes a combined isolation/MOCA bypass circuit 320.

The combined isolation/MOCA bypass circuit 320 may be configured to provide a high degree of isolation (e.g., at least 25 dB) between the first output 304 and the second output 306 in the standard cable television network operating band (i.e., between about 5 MHz and about 1002 MHz), while allowing signals in at least the 1150 MHz to 1550 MHz MOCA frequency band to pass between the first output 304 and the second output 306 with a relatively low degree of loss (e.g., less than 2-10 dB). In some embodiments, the isolation/MOCA bypass circuit 320 and the directional coupler 310 may be implemented as a single circuit. In other embodiments, the MOCA bypass circuit 320 and the directional coupler 310 may be implemented as separate circuits.

Figure 4:
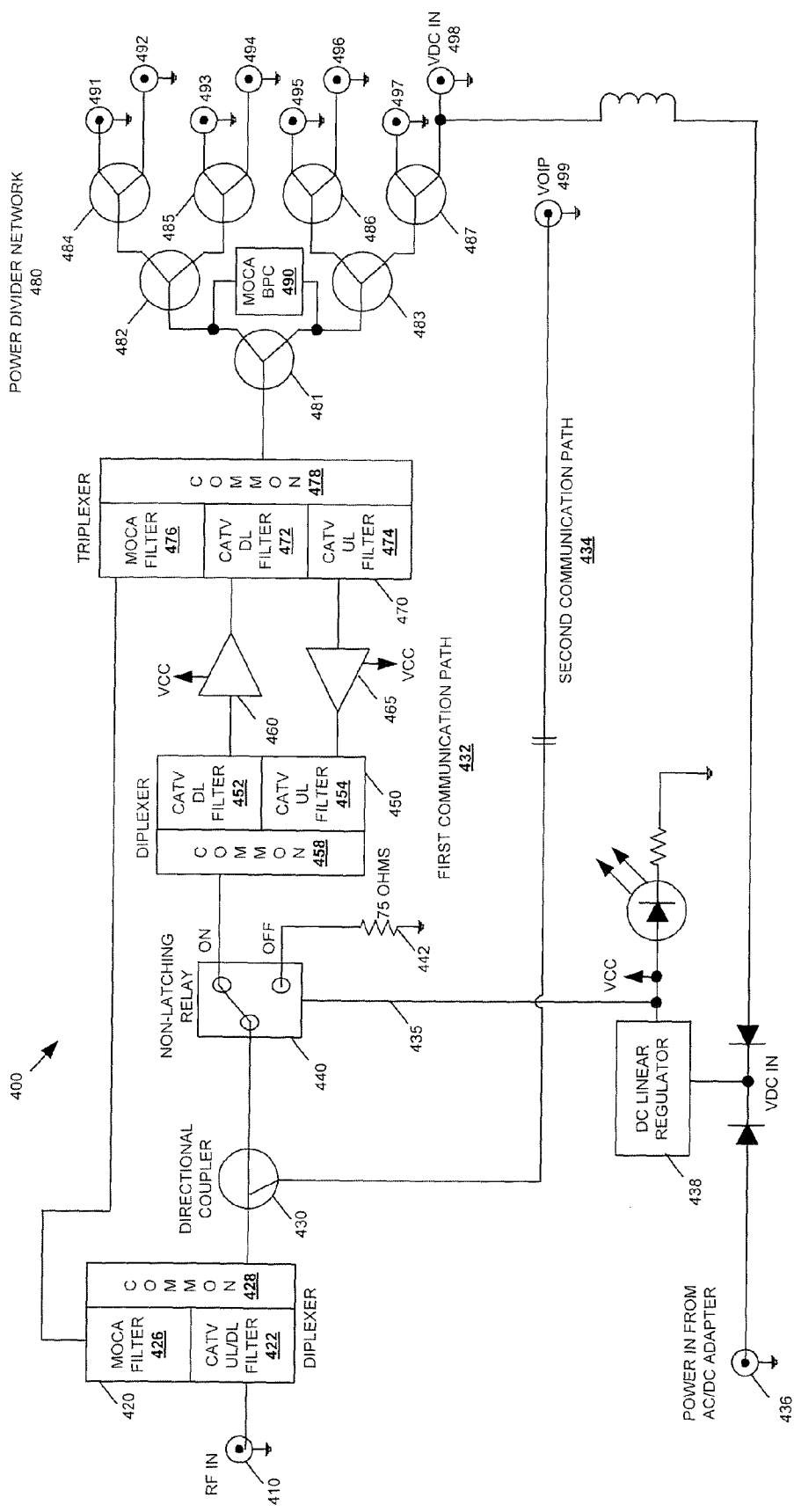
FIG. 4 is a block diagram of a bi-directional RF signal amplifier for a cable television network that includes a MOCA bypass circuit in accordance with embodiments of the present invention.

FIG. 4 is a block diagram of a bi-directional RF signal amplifier 400 according to certain embodiments of the present invention. The amplifier 400 includes a MOCA bypass circuit 490 that can provide for improved signal quality and reliability for MOCA communications.

As shown in FIG. 4, the amplifier 400 includes an RF input 410, a diplexer 420, a directional coupler 430, a non-latching relay 440, a diplexer 450, power amplifiers 460, 465, a triplexer 470, a power divider network 480 and a plurality of RF output ports 491-498, all of which are part of a first communications path. The amplifier 400 further includes a second communications path that has a Voice over IP ("VoIP") output port 499. The amplifier 400 also includes an AC/DC adapter power input 436 and a DC linear regulator 438 that may be used to provide a power supply voltage $V_{CC}$ that is used to operate the power amplifiers 460, 465. Amplifier 400 can support bi-directional RF communications between the RF input port 410 and the RF output ports 491-498. In addition, amplifier 400 uses the directional coupler 430 and the non-latching relay 440 to provide a non-interruptible communication port 499 that may be used to provide non-interruptible VoIP service, as will be discussed in more detail below.

The RF input port 410 receives RF signals from a service provider, such as a cable television operator, or from any other appropriate signal source. RF input port 410 can also pass output signals in the reverse direction from the amplifier 400 through the port 410 to the service provider or other signal source. The signals that are passed in the reverse direction through the amplifier 400 and its RF input port 410 to the service provider may originate at one or more devices that can send and/or receive RF signals such as, for example, telephone, CATV, Internet, VoIP, and/or data communication devices that are connected to one or more of the RF output ports 491-499 of the amplifier 400.

Signals received through the input port 410 are provided to a diplexer 420. The diplexer 420 includes a cable television upstream/downstream filter 422 that is coupled to the input port 410. The cable television upstream/downstream filter 422 is configured to pass signals in the 5 MHz to 1002 MHz cable television frequency band and to block signals in the 1150 MHz to 1550 MHz MOCA frequency band. The diplexer 420 further includes a MOCA filter 426 that passes signals in the 1150 MHz to 1550 MHz MOCA frequency band and blocks signals in the 5 MHz to 1002 MHz cable television frequency band. The output of the MOCA filter 426 is coupled to another MOCA filter 476 that is part of the triplexer 470. The MOCA filters 426, 476 may each comprise, for example, a bandpass filter or a high pass filter. The common output 428 of the diplex filter 420 is coupled to a directional coupler 430.

The directional coupler 430 divides the signal received from the common output 428 of diplexer 420 to provide a portion of the signal to each of a first communication path 432 and a second communication path 434. It will be appreciated that the directional coupler 430 may comprise a splitter that generally evenly splits the signal received from the cable television filter 422 between the first communications path 432 and the second communications path 434, or can unevenly split the received signal power.

As shown in FIG. 4, the first communications path 432 includes a non-latching relay 440, a high/low diplexer 450, a first power amplifier 460 on a forward communications path, a second power amplifier 465 on a reverse communications path, a triplexer 470 and a power divider network 480. The first communications path 432 connects the first output of the directional coupler 430 to the RF output ports 491-498. In particular, the signals output by directional coupler 430 to the first communications path 432 are first input to the non-latching relay 440. When the non-latching relay 440 is in the "ON" or "SET" state, these signals then pass to the high/low diplexer 450. The high/low diplexer 450 includes a cable television downstream filter 452 and a cable television upstream filter 454 that separate the cable television downstream signals from any cable television upstream signals that are incident in the reverse direction. In particular, the cable television downstream filter 452 filters the signals in a manner such that signals with frequencies greater than approximately 54 MHz (i.e., the input signals that are received from port 410) are passed in the forward direction. Similarly, the cable television upstream filter 454 allows signals with frequencies lower than 42 MHz (i.e., the signals that are received from the RF output ports 491-498) to pass in the reverse direction.

The signals passed by the cable television downstream filter 452 are amplified by the individual amplifier 460, and passed to the triplexer 470. The triplexer 470 includes a cable television downstream filter 472, a cable television upstream filter 474 and a MOCA filter 476. The a cable television downstream filter 472 passes signals with frequencies in the range of, for example, 54 MHz through 1002 MHz in the forward direction. The cable television upstream filter 474 passes signals with frequencies below about 42 MHz in the reverse direction, while filtering out any cable television downstream signals or MOCA signals. The MOCA filter 476 passes any signals in the frequency range of about 1150 MHZ to 1550 MHz (or more) in either the forward or reverse directions.

The common output 478 of the diplexer 470 is coupled to a 1×N power divider network 480. In the particular embodiment of FIG. 4, the power divider network 480 is a 1×8 power divider network that includes seven cascaded directional couplers 481-487 that provide a total of eight outputs that are connected to (and/or which form) eight RF output ports 491-498. In particular, a directional coupler 481 receives the output of the diplexer 470. The first output of the directional coupler 481 is coupled to the input of a directional coupler 482, and the second output of the directional coupler 481 is coupled to the input of a directional coupler 483. The first output of the directional coupler 482 is coupled to the input of a directional coupler 484, and the second output of the directional coupler 482 is coupled to the input of a directional coupler 485. The first output of the directional coupler 483 is coupled to the input of a directional coupler 486, and the second output of the directional coupler 483 is coupled to the input of a directional coupler 487. The first outputs of the directional couplers 484-487 are coupled to (or comprise) RF output ports 491, 493, 495 and 497, respectively, and the second outputs of the directional couplers 484-487 are coupled to (or comprise) RF output ports 492, 494, 496 and 498, respectively.

As is also illustrated in FIG. 4, the power divider network 480 includes at least one MOCA bypass circuit 490. In particular, a MOCA bypass circuit 490 is provided between the first and second outputs of the first (leftmost) directional coupler 481 in the power divider network 480. As discussed above with respect to FIGS. 2 and 3, the MOCA bypass circuit 490 may comprise a circuit that passes signals in the MOCA frequency band from the first output of directional coupler 481 to the second output of directional coupler 481 with relatively low loss (e.g., less than 2-10 dB or, more preferably, about 3 dB or less), and vice versa. In some embodiments, the MOCA bypass circuit 490 may be implemented as a bandpass filter that passes signals in, for example, the 1150 MHz to 1550 MHz frequency band (or some other band over which MOCA signals are to be transmitted). In other embodiments, the MOCA bypass circuit 490 may be implemented as a high pass filter that passes signals above, for example, 1150 MHz. Herein, the term "bandpass/high pass filter" is used to refer to a filter that is either a bandpass filter or a high pass filter (i.e., the term encompasses both types of filters). As will be explained in greater detail below, the MOCA bypass circuit 490 may reduce the losses experienced by signals transmitted over a MOCA network, thereby providing for MOCA networks having improved performance, robustness and reliability.

Turning now to the reverse signal flow through the first communication path 432 of amplifier 400, signals received by the amplifier 400 from devices in communication with RF output ports 491-498 are passed to the power divider network 480 where they are combined into a composite reverse path signal. This composite reverse path signal is fed to the common output 478 of the triplexer 470, which separates the low frequency reverse path signal from any high frequency input signal incident in the forward direction and/or from any MOCA signals. Accordingly, the triplexer 470 allows signals with frequencies lower than approximately 42 MHz to pass in the reverse direction through cable television upstream filter 474.

The composite reverse path signal filtered by the triplexer 470 is amplified by the individual amplifier 465, and passed to high/low diplexer 450 where it is combined with the input signals. The amplifiers 460 and 465 may have different gains. For example, in some embodiments, amplifier 460 may have about 18 dB gain, while amplifier 465 may have about 15 dB gain. Moreover, in some embodiments, individual amplifier 465 can optionally be omitted. The reverse path signal is provided by the common output 458 of diplexer 450 to the non-latching relay 440 where it is passed to the diplexer 420 via the directional coupler 430. The diplexer 420 separates the low frequency (e.g., less than 42 MHz) reverse path signals and the mid-range frequency (e.g., 54 MHz to 1002 MHz) forward path signals from any high frequency MOCA signals that are incident in either direction. The reverse path signal passes from the diplexer 420 through the RF input port 410 for output to a service provider or other entity in communication with the RF input port 410.

During normal operation, the amplifier 400 can be powered, for example, from a power input port 436 and/or power that is reverse fed through one of the RF output ports (e.g., output port 498 in FIG. 4). In a typical installation at a subscriber's residence, amplifier 400 may be powered by an AC/DC adapter receiving power provided by the residence (for example, 100-230 VAC, 50/60 Hz). As illustrated in FIG. 4, the power received from either power input can be provided to a voltage regulator 438 which supplies an operating voltage VCC to the individual amplifiers 460 and/or 465.

In the event that power to voltage regulator 438 is interrupted, voltage regulator 438 stops providing the operating voltage VCC to individual amplifiers 460 and/or 465. As a result, individual amplifier 460 will not function to amplify the input signals received through port 410 for proper distribution to the various output ports 491-498. Similarly, individual amplifier 465 also will not function to amplify the reverse path signals received from ports 491-498.

Accordingly, amplifier 400 includes a second, non-interruptible communication path 434 between input port 410 and another RF output port 499 which may be used, for example, to provide non-interruptible Voice Over IP ("VOIP") service. In particular, as shown in FIG. 4, the signals output by directional coupler 430 to the second communications path 434 may be passed directly to the RF output port 499. Consequently, even if power is interrupted such that the amplifiers 460 and 465 are rendered inoperable, a second, non-interruptible communication path 434 still exists between RF input port 410 and RF output port 499 which can be used to support communication of at least one or more services, such as emergency 911 telephone service.

As is also illustrated in FIG. 4, amplifier 400 provides a VCC path 435 to relay 440. When power (i.e., VCC) is interrupted, the relay 440 switches from the normal signal path in the "ON" (or "SET") position, to the "OFF" (or "RESET") position (or vice versa when power is resumed). The second output port of relay 440 (the "OFF" port) is connected to a matched resistive termination (here a 75 ohm resistor 442 that is terminated to ground). When the power supply is interrupted, the relay 440 senses the interruption and switches from the "ON" position to the "OFF" position. As the OFF position of relay 440 is coupled to the matched resistive termination, both outputs of the directional coupler 430 are matched. As such, signal degradation due to reflections and the like can be reduced or minimized in order to provide acceptable signal quality on the second, non-interruptible communications path 434. Herein, the term "matched termination" refers to a termination that approximately matches the impedance of the transmission path (in this case 75 ohms), thus being capable of substantially absorbing the possible propagation modes with minimal reflection. By providing such a matched resistive termination in signal amplifier 400, the directional coupler 430 may have two impedance matched output terminals even when the integrated circuit chip containing the power amplifiers 460 and 465 shuts down for lack of power, and hence reflections that result in return loss, frequency response and/or other signal degradation can be reduced in these circumstances. This may significantly improve the signal quality on the second, non-interruptible communication path 434 (in both the forward and reverse directions) when the first communication path 432 is terminated to the matched termination.

As discussed above, the amplifier 400 of FIG. 4 includes a MOCA bypass circuit 490. FIGS. 5-8 illustrate how this MOCA bypass circuit 490 may improve the performance of a MOCA network that operates through amplifier 400.

Figure 5:
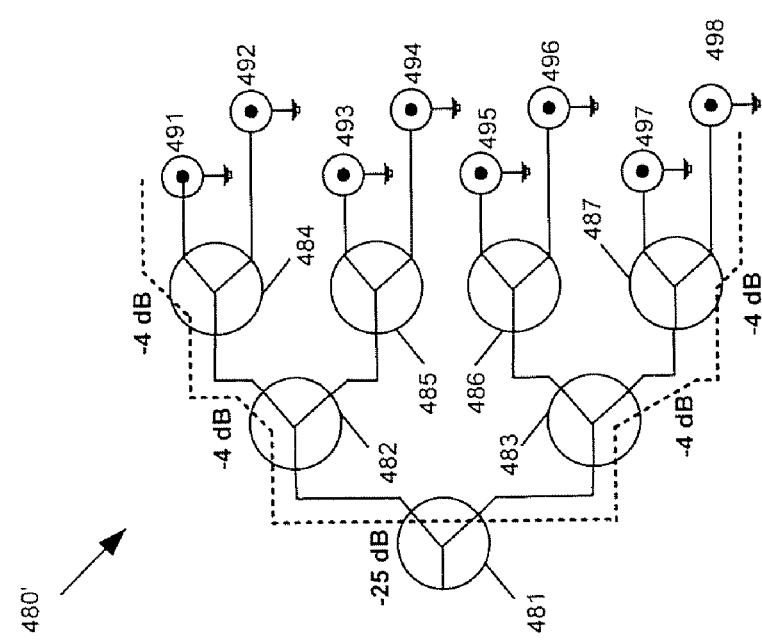
FIG. 5 is a block diagram of a conventional power divider that illustrates approximate signal losses that may occur if a MOCA signal is transmitted over certain paths through the circuit.

In particular, FIG. 5 illustrates the losses experienced by a MOCA signal that is transmitted from RF output port 491 to RF output port 498 input through a power divider network 480'. The power divider network 480' is identical to the power divider network 480 of FIG. 4, except that power divider network 480' does not include the MOCA bypass circuit 490. As shown by the dotted line in FIG. 5, such a MOCA signal first passes through directional coupler 484, then through directional coupler 482, then across the outputs of directional coupler 481, then through directional coupler 483, then through directional coupler 487 to RF output port 498. Typically, a directional coupler that evenly splits an input signal will exhibit a loss of about 3.5-4.5 dB when passing a signal from one of its outputs to its input. This loss is typically frequency dependent, with a loss of, for example, approximately 3.5 dB at 50 MHz and a loss of 3.9 to 4.5 dB at 1 GHz. Assuming, for example, that traversing a directional coupler (in either direction) results in a loss of 4 dB, and that the directional couplers 481-487 provide 25 dB of isolation between their outputs in the MOCA frequency band (which is likely a conservative assumption for a directional coupler that includes a 25 dB isolation matching circuit for the 5 MHz to 1002 MHz frequency band), then, as shown in FIG. 5, a MOCA signal that is passed from RF output port 491 to RF output port 498 in the power divider network 480' will exhibit a loss of 41 dB. The same 41 dB loss would result for MOCA signals transmitted from any of ports 491-494 to any of ports 495-498, or vice versa.

Figure 6:
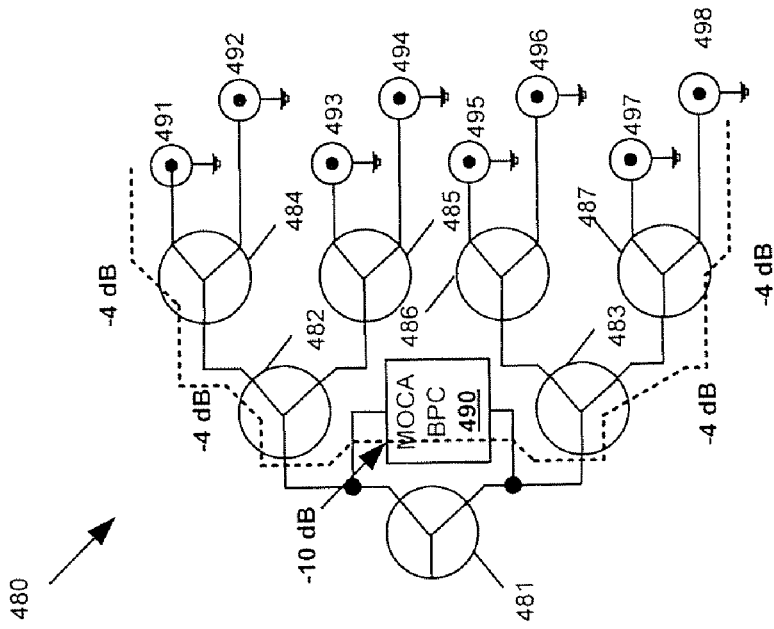
FIG. 6 is a block diagram of a power divider circuit according to embodiments of the present invention that illustrates approximate signal losses that may occur if a MOCA signal is transmitted over certain paths through the circuit.

FIG. 6, in contrast, illustrates the losses experienced by a MOCA signal that is input to the power divider network 480 of FIG. 4 on RF output port 491 that is transmitted to RF output port 498. In FIG. 6, it is assumed that MOCA signals passing through the MOCA bypass circuit 490 experience a loss of 10 dB. As shown in FIG. 6, a MOCA signal that is passed from RF output port 491 to RF output port 498 in the power divider network 480 will exhibit a loss of 26 dB. The same 26 dB loss would result for MOCA signals transmitted from any of ports 491-494 to any of ports 495-498. Thus, it can be seen that the power divider network 480 provides a 15 dB decrease in the loss for MOCA signals that are transmitted between certain port combinations as compared to the power divider network 480' of FIG. 5.

Figure 7:
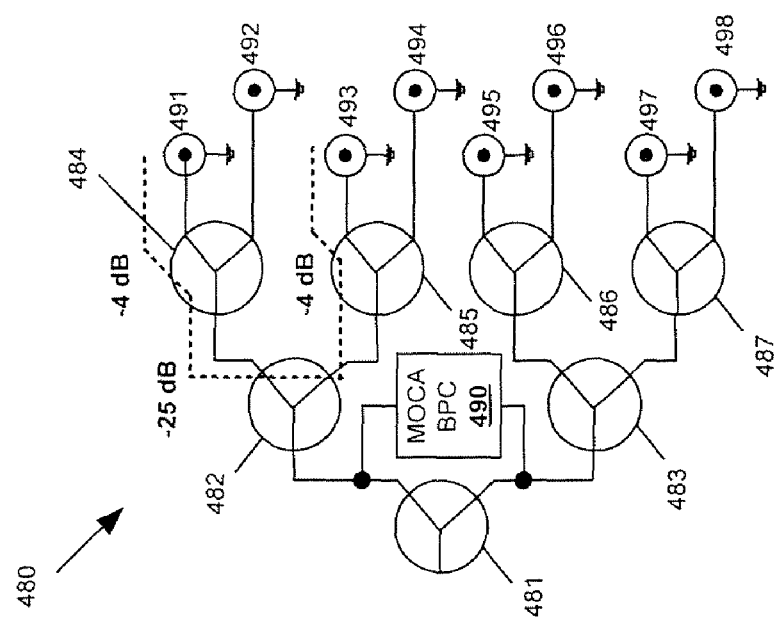
FIG. 7 is a block diagram of the power divider circuit of FIG. 6 that illustrates approximate signal losses that may occur if a MOCA signal is transmitted over additional paths through the circuit.

FIG. 7 illustrates the losses experienced by a MOCA signal that is to be transmitted from RF output port 491 to RF output port 493 through the power divider network 480. As shown in FIG. 7, a MOCA signal that is passed from RF output port 491 to RF output port 493 will exhibit a loss of 33 dB. The same 33 dB loss would result for MOCA signals transmitted from either of ports 491 or 492 to either of ports 493 or 494 (and vice versa), or from either of ports 495 or 496 to either of ports 497 or 498 (and vice versa). The same losses would be experienced with power divider network 480'.

Figure 8:
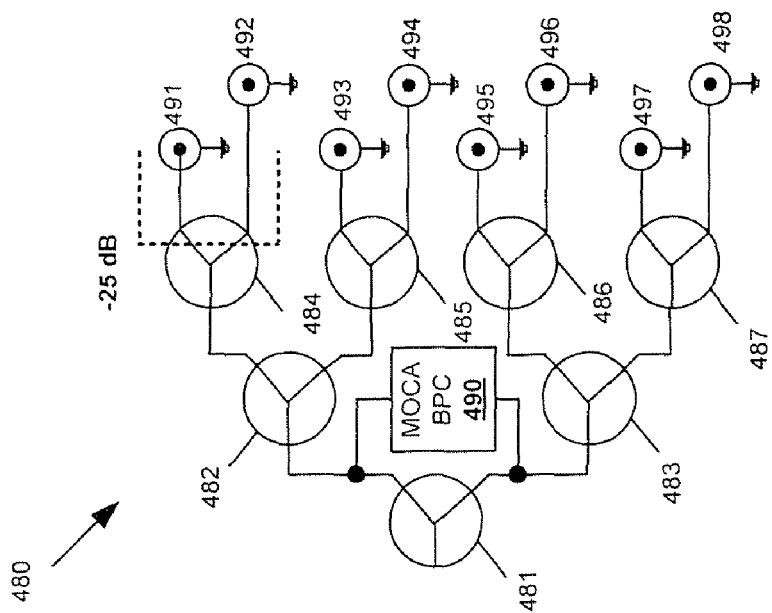
FIG. 8 is a block diagram of the power divider circuit of FIG. 6 that illustrates approximate signal losses that may occur if a MOCA signal is transmitted over still further paths through the circuit.

Finally, FIG. 8 illustrates the losses experienced by a MOCA signal that is to be transmitted from RF output port 491 to RF output port 492 (or vice versa) through the power divider network 480. As shown in FIG. 8, such a signal will exhibit a loss of 25 dB. The same 25 dB loss would result for MOCA signals transmitted from port 493 to port 494 (and vice versa), from port 495 to port 496 (and vice versa) and from port 497 to port 498 (and vice versa). The same losses would be experienced with power divider network 480'.

In summary, FIGS. 5-8 show that the maximum loss experienced by a MOCA signal traversing an 8-output power divider network according to certain embodiments of the present invention may be reduced from approximately 41 dB to approximately 33 dB, or an improvement of 8 dB.

Figure 9:
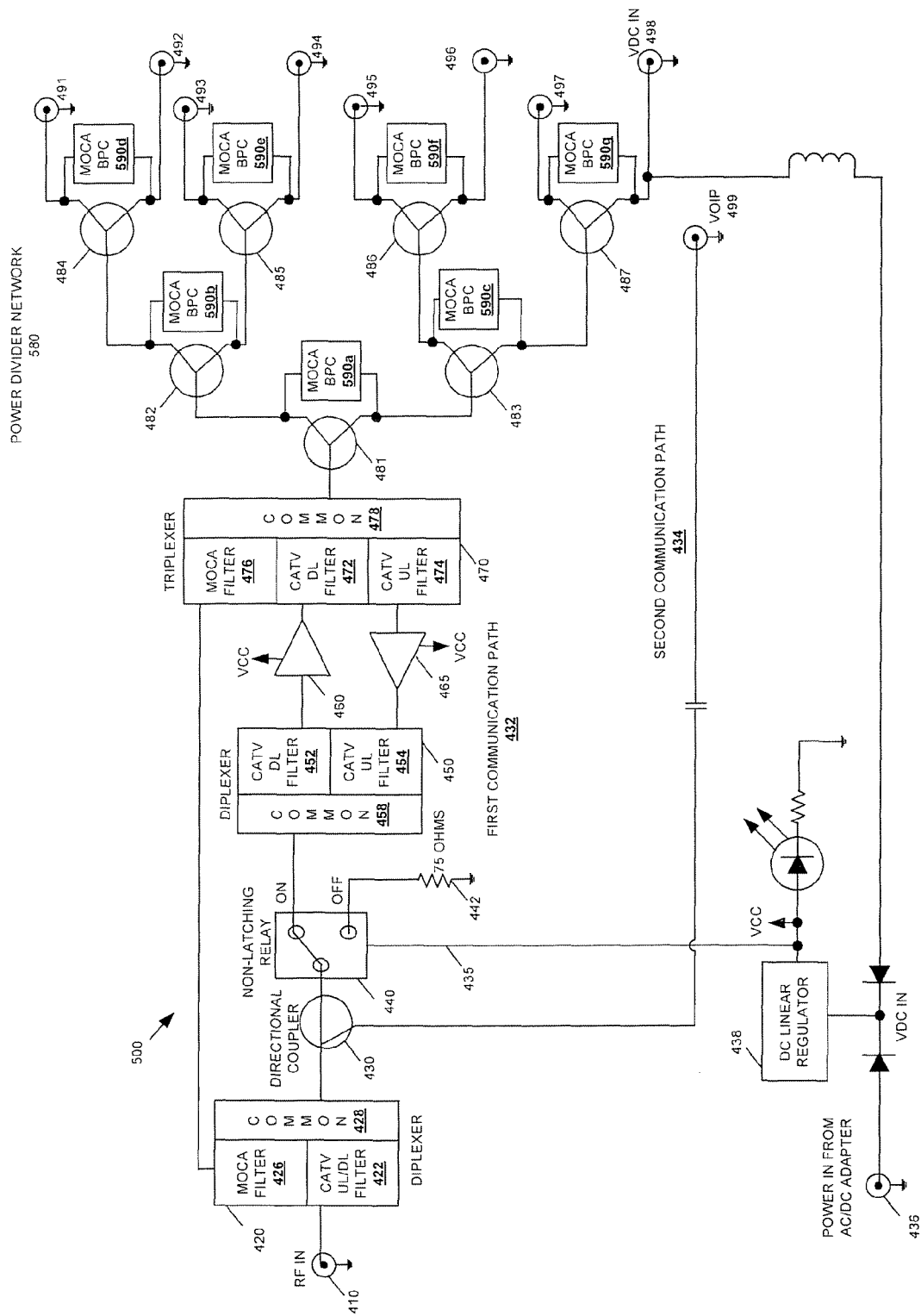
FIG. 9 is a block diagram of a bi-directional RF signal amplifier for a cable television network that includes a MOCA bypass circuit in accordance with further embodiments of the present invention.

FIG. 9 is a block diagram of a bi-directional RF signal amplifier 500 according to further embodiments of the present invention. The amplifier 900 includes a plurality of MOCA bypass circuits 590*a*-590*g* that can provide for improved signal quality and reliability for MOCA communications.

As shown in FIG. 9, the amplifier 500 may be essentially identical to the amplifier 400 of FIG. 4, except that the amplifier 500 includes a modified power divider network 580. Accordingly, like elements of the amplifier 500 are numbered the same as their corresponding elements in the amplifier 400, and further discussion of these components will be omitted.

Figure 11:
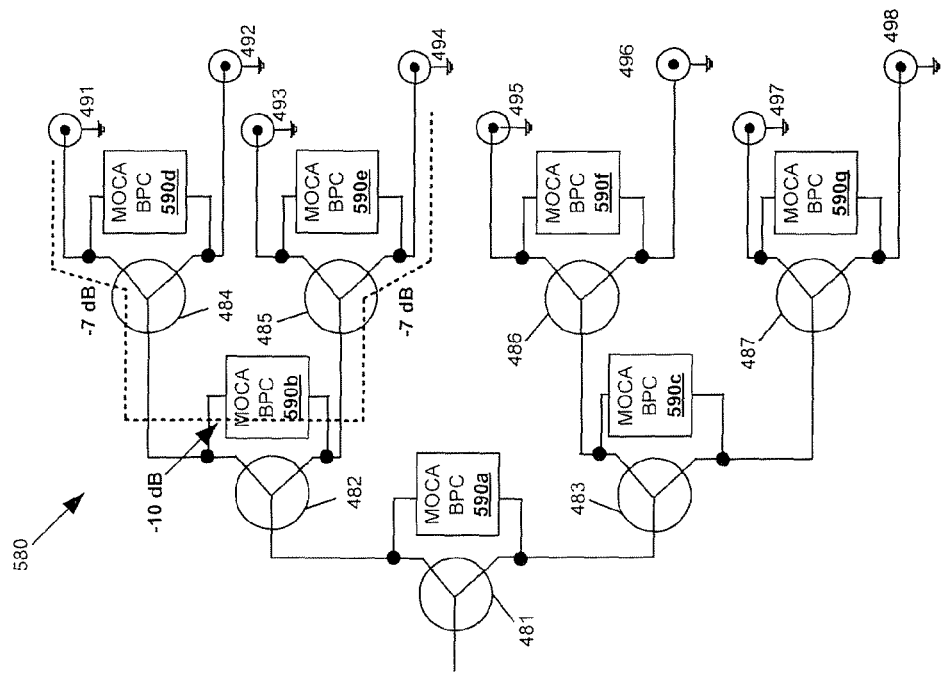
FIG. 11 is a block diagram of the power divider circuit of FIG. 10 that illustrates approximate signal losses that may occur if a MOCA signal is transmitted over additional paths through the circuit.
Figure 10:
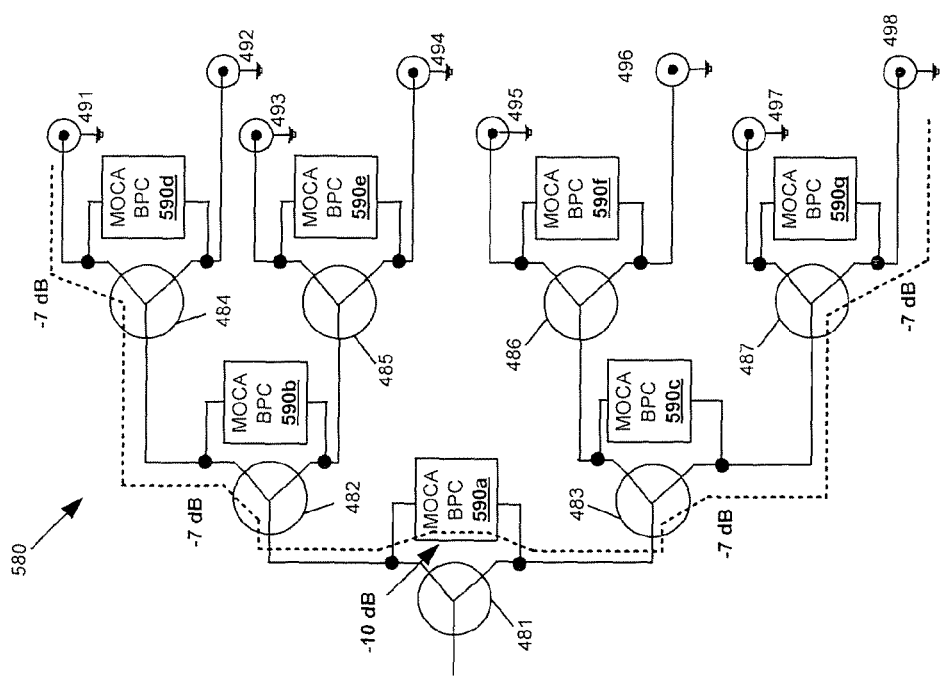
FIG. 10 is a block diagram of a power divider circuit according to further embodiments of the present invention that illustrates approximate signal losses that may occur if a MOCA signal is transmitted over certain paths through the circuit.
Figure 12:
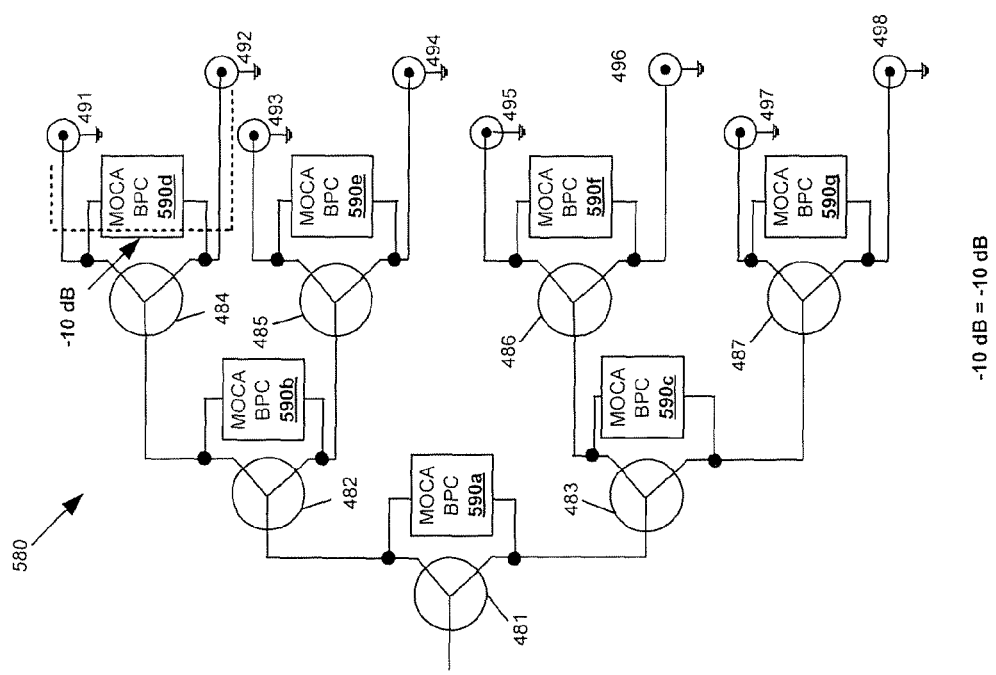
FIG. 12 is a block diagram of the power divider circuit of FIG. 10 that illustrates approximate signal losses that may occur if a MOCA signal is transmitted over still further paths through the circuit.

As is apparent from a comparison of FIGS. 4 and 9, the difference between the power amplifier 400 and the power amplifier 500 is that the power divider network 480 of the amplifier 400 only includes a MOCA bypass circuit 490 on its first directional coupler 481, whereas the power divider network 580 of amplifier 500 includes a respective MOCA bypass circuit 590*a*-590*g* on all seven directional couplers 481-487. In some embodiments, each of the MOCA bypass circuits 590*a*-590*g* can be identical to the MOCA bypass circuit 490 discussed above with respect to FIG. 4. FIGS. 10-12 illustrate how the MOCA bypass circuits 590*a*-590*g* may improve the performance of a MOCA network that operates through amplifier 500 as compared to an amplifier that has a power divider network that does not include any MOCA bypass circuits such as the power divider network 480' of FIG. 5.

As shown in FIG. 10, the losses experienced by a MOCA signal that is input to the power divider network 580 of FIG. 9 on RF output port 491 that is to be transmitted to RF output port 498 first passes through directional coupler 484, then through directional coupler 482, then through MOCA bypass circuit 590*a*, then through directional coupler 483, then through directional coupler 487 to RF output port 498. In FIG. 10, it is again assumed that signals traversing a standard directional coupler (in either direction) results in a loss of 4 dB, and that MOCA signals passing through any of the MOCA bypass circuits 590*a*-590*g* experience a loss of 3 dB. Additionally, it is assumed that signals traversing a directional coupler (in either direction) that includes a MOCA bypass circuit experiences a loss of 7 dB, as the MOCA bypass circuit adds additional signal loss. As shown in FIG. 10, with these assumptions, a MOCA signal that is passed from RF output port 491 to RF output port 498 in the power divider network 580 of FIG. 10 will exhibit a loss of 38 dB. The same 38 dB loss would result for MOCA signals transmitted from any of ports 491-494 to any of ports 495-498, or vice versa.

FIG. 11 illustrates the losses experienced by a MOCA signal that is to be transmitted from RF output port 491 to RF output port 493 in the power divider network 580. As shown in FIG. 11, a MOCA signal that is passed from RF output port 491 to RF output port 493 will exhibit a loss of 24 dB. The same 24 dB loss would result for MOCA signals transmitted from either of ports 491 or 492 to either of ports 493 or 494 (and vice versa), or from either of ports 495 or 496 to either of ports 497 or 498 (and vice versa).

Finally, FIG. 12 illustrates the losses experienced by a MOCA signal that is to be transmitted from RF output port 491 to RF output port 492 (or vice versa) in power divider network 580. As shown in FIG. 12, such a signal will exhibit a loss of only 10 dB. The same 10 dB loss would result for MOCA signals transmitted from port 493 to port 494 (and vice versa), from port 495 to port 496 (and vice versa) and from port 497 to port 498 (and vice versa). Thus, FIGS. 5 and 10-12 show that the maximum loss experienced by a MOCA signal traversing an 8-output power divider network 580 according to further embodiments of the present invention may be reduced from approximately 41 dB to approximately 38 dB, or an improvement of 3 dB.

Figure 15:
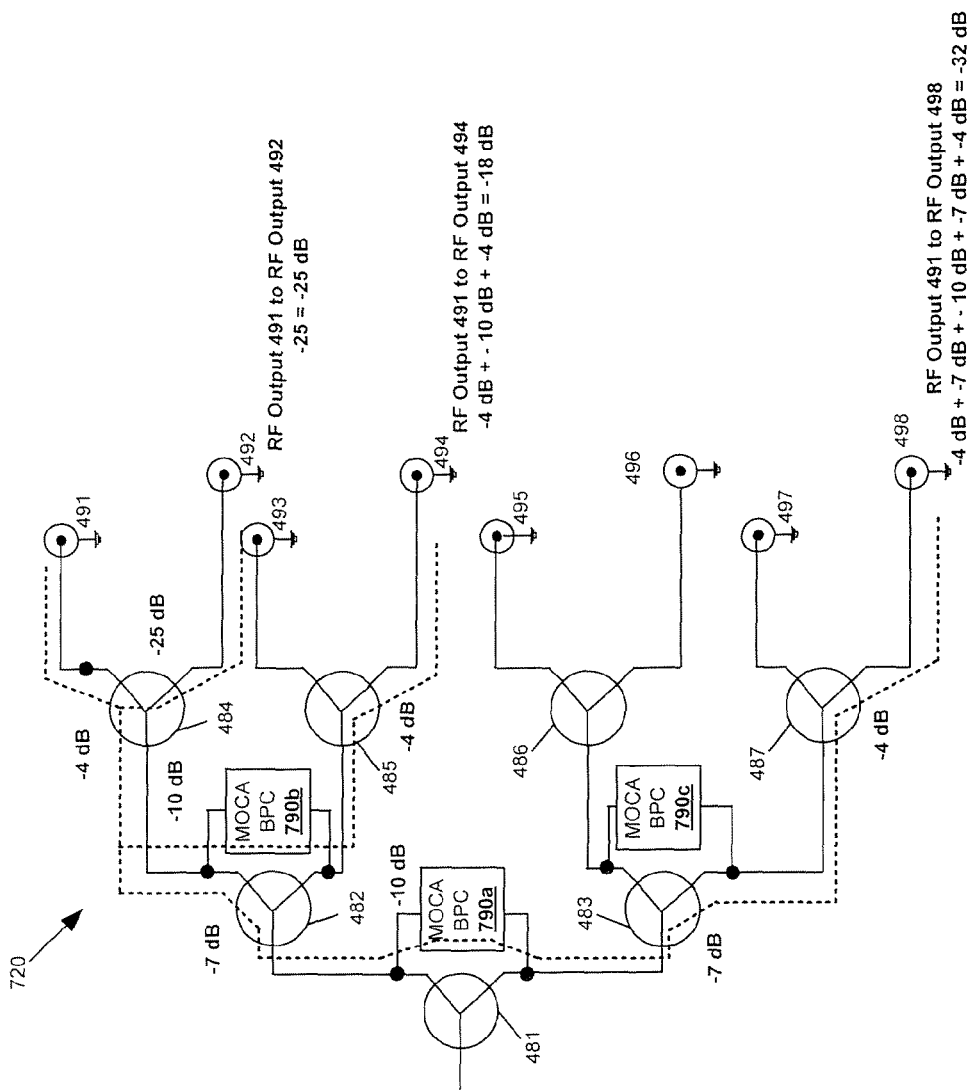
FIG. 15 is a block diagram of a power divider circuit according to still further embodiments of the present invention that illustrates approximate signal losses that may occur if a MOCA signal is transmitted over certain paths through the circuit.

It will be appreciated that the amplifiers 400 and 500 of FIGS. 4 and 9 only represent illustrative embodiments of the present invention, and that numerous other amplifiers may be implemented that employ the teachings of the present invention. By way of example, in further embodiments, a MOCA bypass circuit could be provided between the outputs of each of the directional couplers 481-483 (FIG. 15 illustrates such an implementation). As will be discussed herein, such an embodiment reduces the number of MOCA bypass circuits required as compared to the amplifier 500 of FIG. 9, while improving the maximum loss experienced by a MOCA signal by approximately 9 dB as compared to the amplifier 400 of FIG. 4. Likewise, it will be appreciated that the power divider network may have more or less than eight outputs, and that any number of MOCA bypass circuits may be provided.

Likewise, in other embodiments according to the teachings of the present invention the second, non-interruptible communication path 434 may be omitted, as well as the directional coupler 430 and the non-latching relay 440. In still further embodiments, the MOCA filters 426 and 476 may also be omitted.

In some embodiments, the directional couplers (e.g., directional couplers 481-487 of FIG. 4) may be implemented on the same printed circuit board that the amplifiers 460 and 465 are implemented on.

Figure 13:
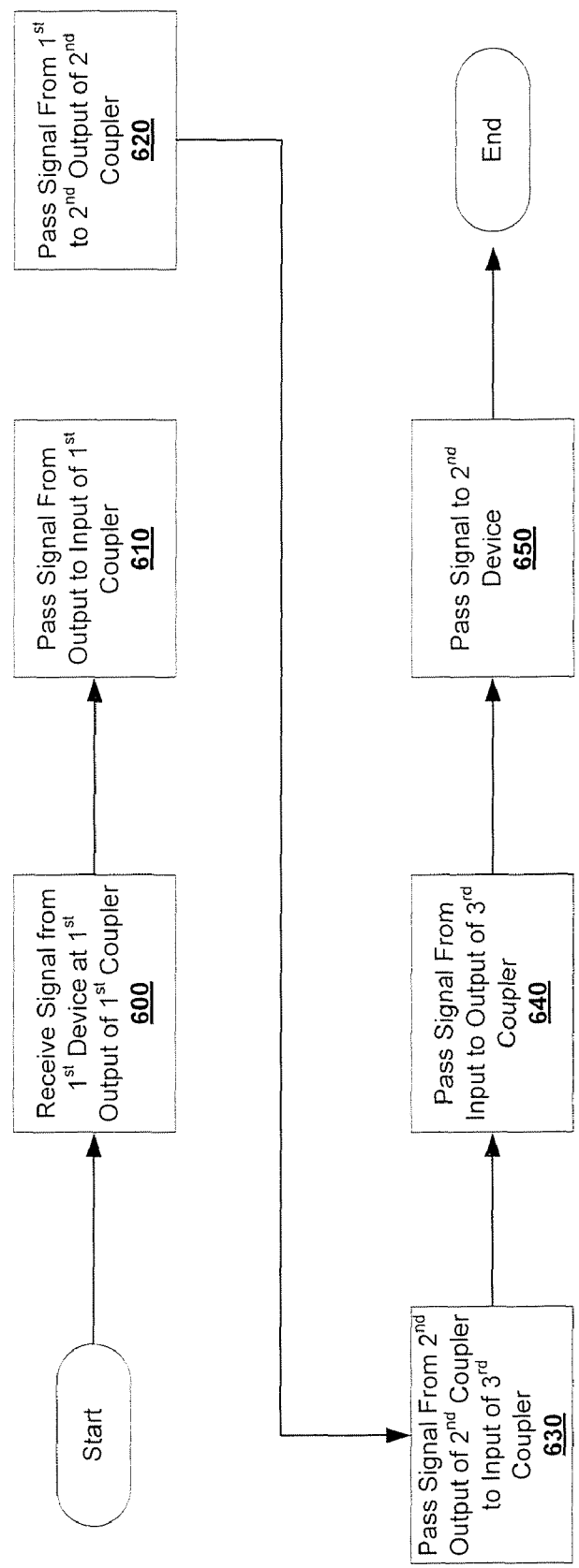
FIG. 13 is a flow chart depicting methods of passing a MOCA signal from a first device to a second device according to certain embodiments of the present invention.

FIG. 13 is a flow chart illustrating methods of passing a MOCA signal from a first device to a second device according to certain embodiments of the present invention. As shown in FIG. 13, pursuant to these methods, a MOCA signal is received from a first device at a first output of a first directional coupler of a power divider network of an RF signal amplifier (block 600). The signal is passed from the first output of the first directional coupler to an input of the first directional coupler (block 610). The input of the first directional coupler is coupled to a first output of a second directional coupler of the power divider network. The signal is then passed from the first output of the second directional coupler to a second output of the second directional coupler via a bypass circuit that passes signals in a MOCA frequency band while providing at least 25 dB of isolation with respect to signals in a CATV frequency band (block 620). The signal is then passed from the second output of the second directional coupler to an input of a third directional coupler (block 630). The signal is then passed from the input of the third directional coupler to an output of the third directional coupler (block 640). Finally, the signal is passed from the output of the third directional coupler to the second device (block 650).

Figure 14:
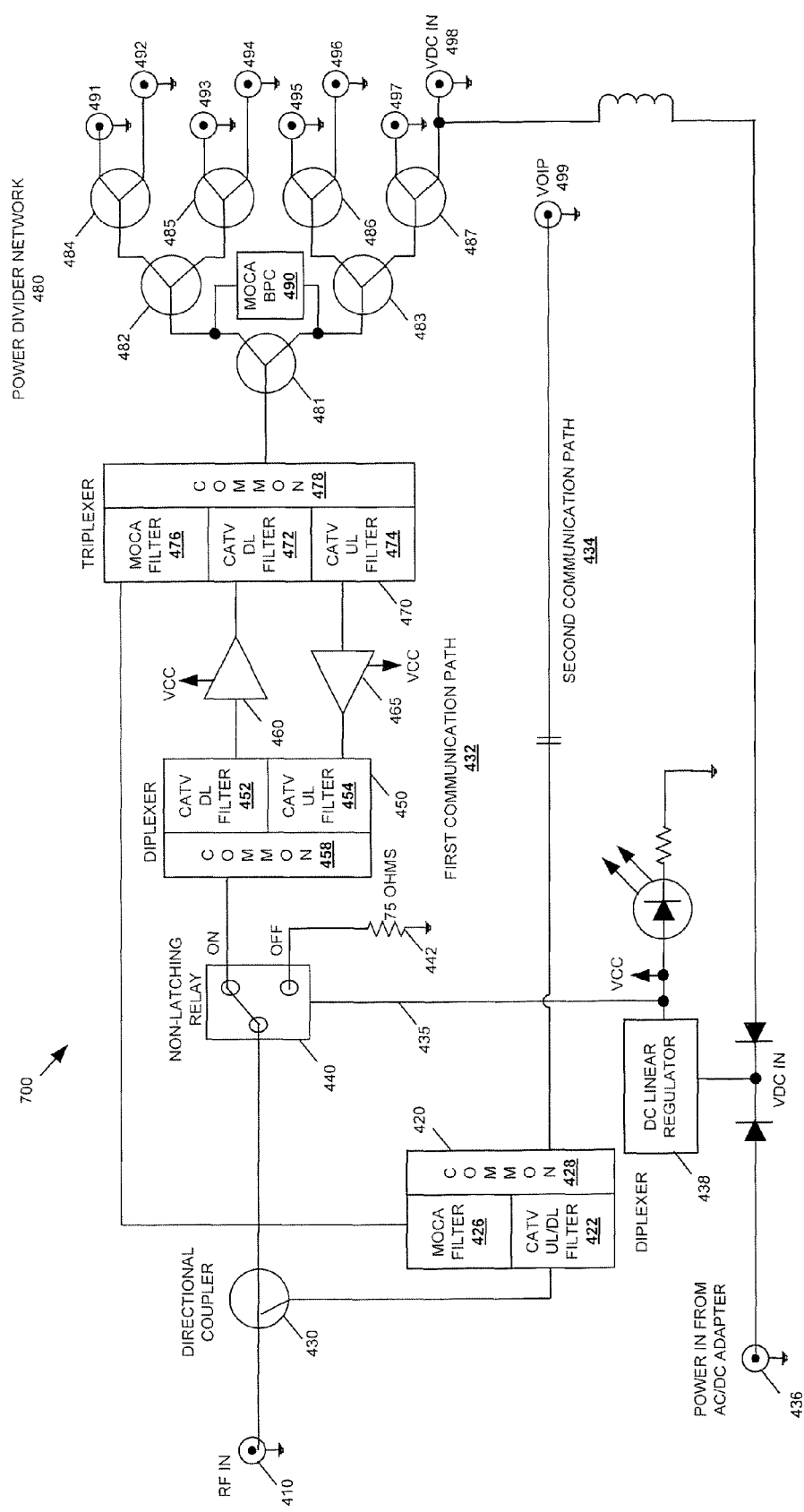
FIG. 14 is a block diagram of a bi-directional RF signal amplifier for a cable television network that includes a MOCA bypass circuit in accordance with still further embodiments of the present invention.

FIG. 14 is a block diagram of a bi-directional RF signal amplifier 700 according to further embodiments of the present invention. The amplifier 700 is almost identical to the amplifier 400 of FIG. 4, and hence the description of amplifier 700 herein will only discuss the differences between amplifiers 400 and 700.

As shown in FIG. 14, in amplifier 700, the diplexer 420 is moved from its position upstream of directional coupler 430 to a position downstream of the directional coupler 430 so as to be part of the second communication path 434. The connection between MOCA filter 426 and MOCA filter 476 allows MOCA signals to be passed from any of the RF output ports 491-498 to RF output port 499 and vice versa. By placing the diplexer 420 downstream of the directional coupler 430, the loss between the RF input port 410 and the RF output ports 491-498 may be reduced. This amplifier 700 may provide improved performance as compared to amplifier 400. Otherwise, the components and operation of amplifier 700 and the components and operation of amplifier 400 may be the same.

Pursuant to further embodiments of the present invention, passive power divider networks are provided that may be used, for example, in cable television networks. These power dividers include an RF input port and a plurality of RF output ports, and at least one directional coupler. These power dividers need not have any active components such as power amplifiers. FIGS. 2, 3, 6 and 10 illustrate power divider networks according to certain embodiments of the present invention. In these figures, the RF input port is input 202 in FIG. 2, input 302 in FIG. 3, and the input to directional coupler 481 in FIGS. 6 and 10.

FIG. 15 illustrates another power divider network 720 according to still further embodiments of the present invention. As shown in FIG. 15, the power divider network 720 differs from the power divider networks of FIGS. 6 and 10 in that it includes MOCA bypass circuits 790a-790c between the outputs of three of the directional couplers, namely directional couplers 481-483, whereas the power divider network 480 of FIG. 6 only includes a MOCA bypass circuit between the outputs of directional coupler 481, and the power divider network 580 of FIG. 10 includes MOCA bypass circuits between the outputs of all seven directional couplers 481-487. As discussed above with respect to FIGS. 6-8, MOCA signals traversing the power divider network 480 may experience losses varying from approximately 26 dB to approximately 33 dB given certain assumed component losses. Likewise, as discussed above with respect to FIGS. 10-12, MOCA signals traversing the power divider network 580 may experience losses varying from approximately 10 dB to approximately 38 dB using the same assumed component losses. As shown in FIG. 15, MOCA signals traversing the power divider network 720 may experience losses varying from approximately 18 dB to approximately 32 dB using the same assumed component loss levels. Thus, for certain component loss levels, the power divider network 720 may minimize the maximum loss that is experienced and may also reduce the differences between the losses experienced by MOCA signals traversing the various different possible paths through the power divider network.

Figure 16:
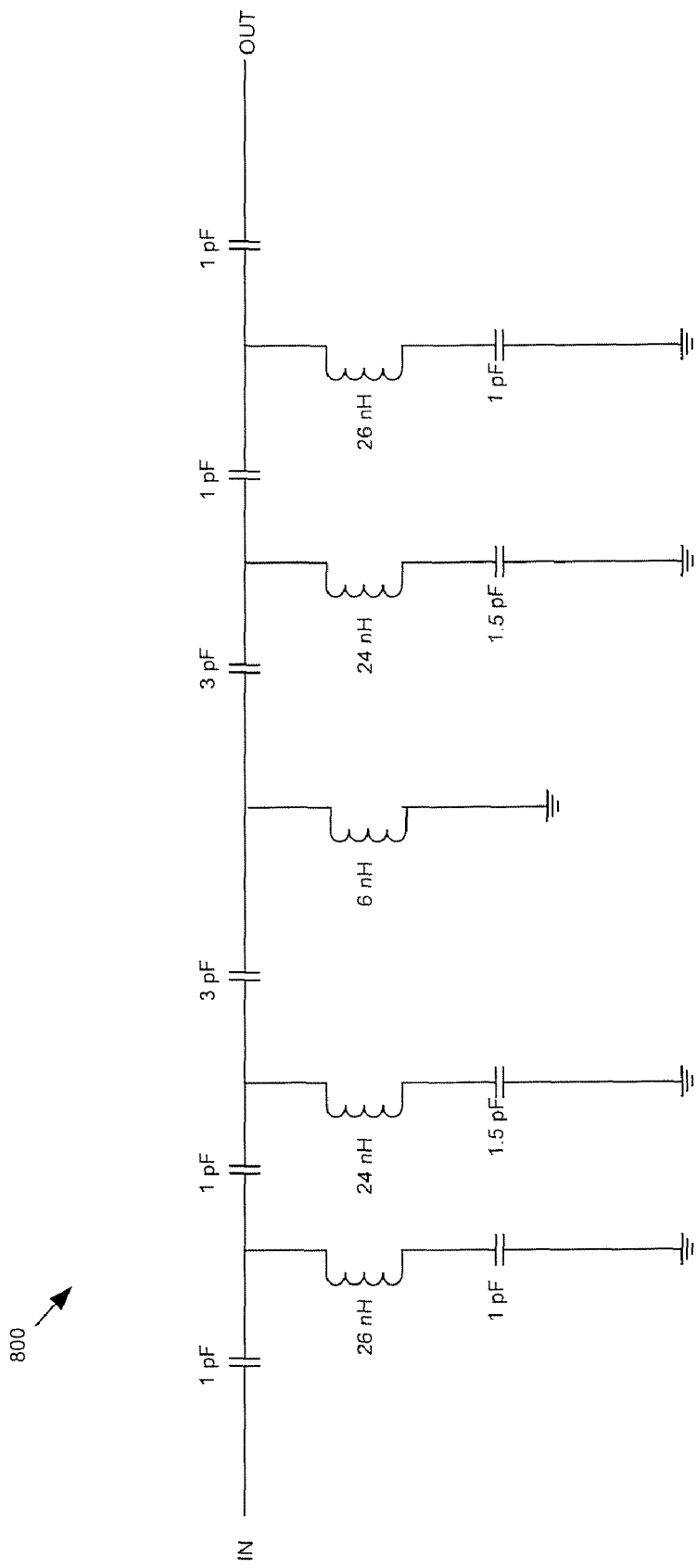
FIG. 16 is a circuit diagram of an implementation of a combined isolation circuit and MOCA bypass circuit according to embodiments of the present invention that may be used, for example, in the power divider network of FIG. 3.

FIG. 16 is a circuit diagram of an implementation 800 according to a specific embodiment of the present invention of the combined 5-1002 MHz isolation circuit and MOCA bypass circuit 320 of the power divider network of FIG. 3. As shown in FIG. 16, the isolation/bypass circuit 800 comprises a string of capacitors that are connected in series between an input port (e.g., leg 304 of the power divider network 300 of FIG. 3) and an output port (e.g., leg 306 of the power divider network 300 of FIG. 3) with shunt inductor-capacitor circuits or an inductor connected in parallel between each of the series capacitors. The isolation/bypass circuit 800 represents one of many different possible implementations of the circuit 320 of FIG. 3.

Figure 17:
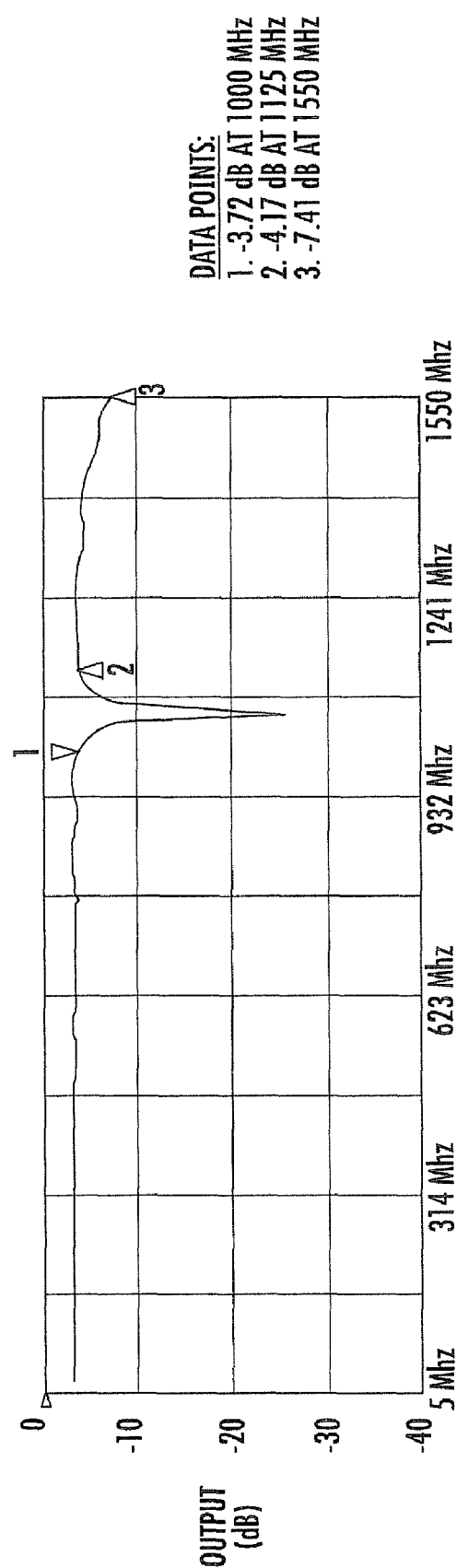
FIG. 17 is a graph showing the signal power at one of the outputs of the power divider network of FIG. 3 in response to an input signal as a function of frequency when the combined isolation circuit and MOCA bypass circuit is implemented using the circuit of FIG. 16.
Figure 18:
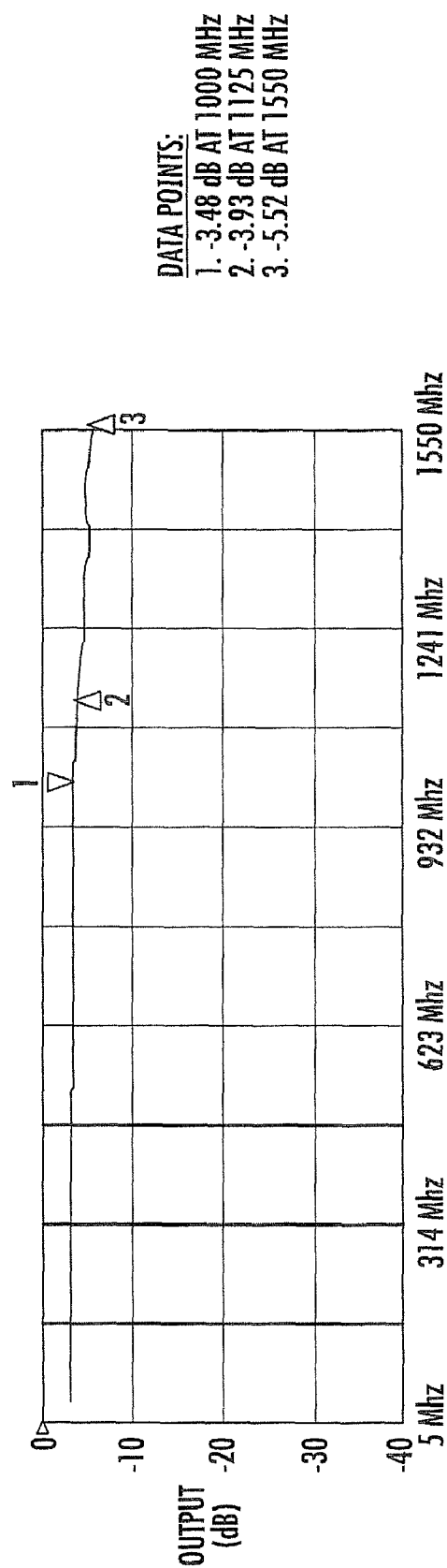
FIG. 18 is a graph showing the signal power at one of the outputs of a conventional power divider network in response to an input signal as a function of frequency.

FIG. 17 is a graph showing the signal power at one of the outputs of the power divider network of FIG. 3 (e.g., output 304) in response to a signal input at input port 302 as a function of frequency when the isolation/bypass circuit 320 of FIG. 3 is implemented using the circuit 800 of FIG. 16. For purposes of comparison, FIG. 18 is a graph that shows the signal power at one of the outputs of the power divider network of FIG. 2 (e.g., output 204) in response to a signal input at input port 202 as a function of frequency if the MOCA bypass circuit 230 is omitted from the power divider network of FIG. 2 (i.e., if a conventional splitter having no MOCA bypass capability is used). Herein, graphs such as the graphs of FIGS. 17 and 18, which show the power of an output signal as compared to the power of an input signal as a function of frequency, are referred to as "frequency response graphs."

As shown in FIG. 18, a conventional splitter will typically pass signals from the input to the output with a relatively constant loss of about 3.5 to 5.5 dB over the frequency range of 5 MHz to 1550 MHz, although slightly greater losses are experienced at the high end of this frequency range (up to −5.52 dB in this example). As shown in FIG. 17, when the combined isolation/bypass circuit 800 is used instead, a similar response is seen over most of the frequency range. However, the response exhibits a sharp null between about 1000 MHz and 1125 MHz in which the signal energy that is passed is greatly reduced (by as much as about 25 dB at the center of the null). Additionally, the inclusion of the bypass capability may also result in slightly reduced performance in terms of energy passed from the input to the outputs of the splitter (e.g., at 1 GHz FIG. 17 shows a reduction in signal power by 3.72 dB whereas FIG. 18 shows a reduction in signal power of only 3.48 dB at 1 GHz).

Pursuant to embodiments of the present invention, MOCA bypass circuits (e.g., circuit 230 of FIG. 2) and/or combined isolation/MOCA bypass circuits (e.g., circuit 320 of FIG. 3) are provided which have a frequency response that includes one or more nulls. For example, as shown in FIG. 17, the frequency response of a power divider network that includes the isolation/bypass circuit 800 includes a sharp null that is located between about 1000 MHz and 1125 MHz. According to certain embodiments of the present invention, the center frequency of this null (i.e., the frequency where the least amount of signal energy is passed) may be located above 870 MHz and below 1150 MHz. In some specific embodiments of the present invention, the center frequency of this null may be located above 1002 MHz and below 1100 MHz. By placing the center frequency of the null in the above frequency ranges, the performance of the power divider network may show little degradation in the cable television frequency band. Moreover, while the null is located within the MOCA frequency band, it will be appreciated that MOCA equipment may be designed so that the null will not cause a problem. By way of example, in some embodiments, the MOCA equipment could be designed to only send signals in the portion of the MOCA frequency band that is above the null.

The null shown in FIG. 17 results because of a resonance between the capacitive and inductive coupling included in the design of the isolation/bypass circuit. As is known to those of skill in the art, filters that include both capacitive and inductive coupling elements can generally provide sharper frequency responses than can filters that only include one or the other. By designing the MOCA bypass circuit to have a null that is in the ranges set forth above it may be possible to maintain good isolation between the output ports in the 5-1002 MHz cable television band while providing a bypass path for signals in the upper end of the MOCA frequency band (e.g., above about 1100 or 1150 MHz).

Figure 19:
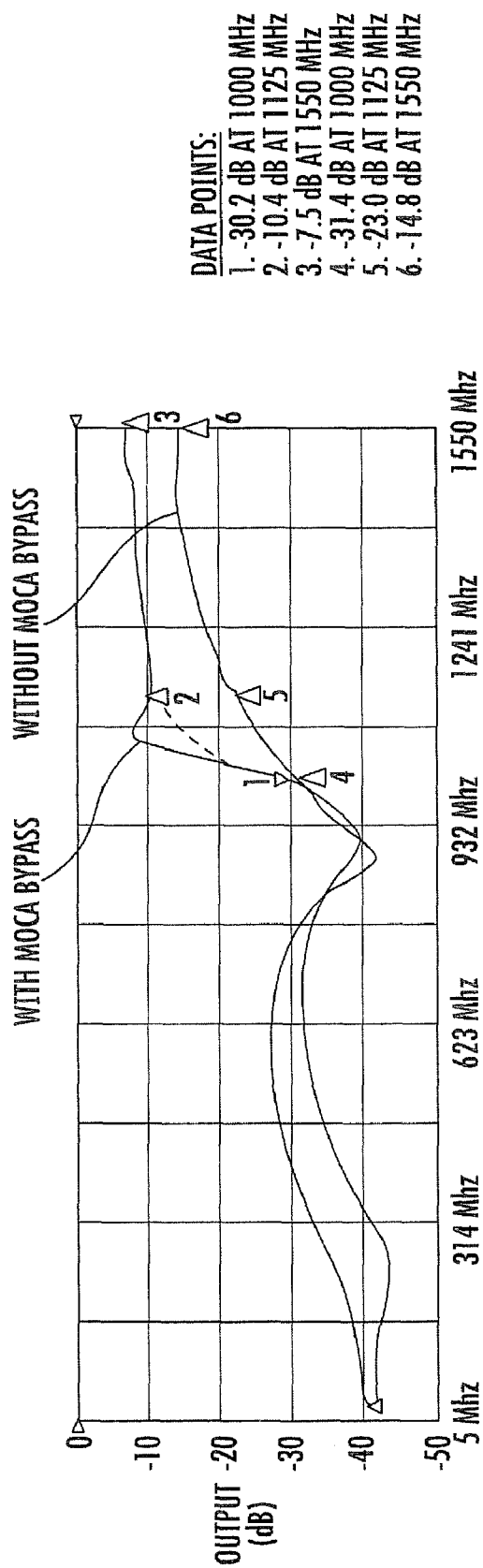
FIG. 19 is a graph showing the signal power at the first output of a power divider network in response to a signal that is input at the second output while the input of the power divider is properly terminated for (a) a power divider network that includes a MOCA bypass circuit and (b) a power divider network that does not include a MOCA bypass circuit.

FIG. 19 is a graph showing the signal power at a first of the outputs of a power divider network in response to a signal that is input at the second output of the power divider network. The graph of FIG. 19 shows this frequency response for two different power dividers. The line on the graph of FIG. 19 labeled "With MOCA Bypass" shows the signal power at output 304 of the power divider network 300 of FIG. 3 in response to a signal that is input at output 306 when the combined isolation/bypass circuit 320 of FIG. 3 is implemented using the circuit 800 of FIG. 16. The line on the graph of FIG. 19 labeled "Without MOCA Bypass" shows the signal power at output 204 of the power divider network 200 of FIG. 2 in response to a signal that is input at output 206 when the MOCA bypass circuit 230 of FIG. 2 is omitted (i.e., this line shows the response between the outputs of a conventional splitter).

As shown in FIG. 19, in the conventional splitter (i.e., the "Without MOCA Bypass" line) the isolation between the outputs exceeds 30 dB for all frequencies within the 5 MHz to 1002 MHz CATV frequency band. However, in portions of the 1150 MHz to 1550 MHz frequency band, the isolation may still be as high as about 22 dB. In contrast, using a power divider network according to embodiments of the present invention (i.e., the "With MOCA Bypass" line), the isolation between the outputs is less than 11 dB for all frequencies above about 1050 MHz, while still maintaining isolation of greater than 25 dB across the entire 5-1002 MHz cable television frequency band. Thus, the worst case loss in the 1150 MHz to 1550 MHz frequency band is 11 dB better than in the conventional splitter. Accordingly, power divider networks according to some embodiments of the present invention (and the signal amplifiers that include such power divider networks) may support communications with a service provider across the entire 5-1002 MHz cable television frequency band, while supporting MOCA signals over at least a portion of the MOCA frequency band (e.g., from 1150 MHz to 1550 MHz).

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A RF signal amplifier for a cable television network, comprising:
    an RF input port;
    a power amplifier coupled to the RF input port;
    a power divider having an input that is coupled to an output of the power amplifier and first and second outputs, the power divider comprising:
        a first directional coupler that has a first output branch and a second output branch; and
        a first bypass circuit coupled between the first and second output branches of the first directional coupler,
    wherein a response of the power divider includes a null that substantially blocks signals received at the input of the power divider from passing to the first or second outputs of the power divider in a subset of frequencies within the range of 5 MHz to 1550 MHz.

2. The RF signal amplifier of claim 1, wherein the center frequency of the null is located in between 870 MHz and 1150 MHz.

3. The RF signal amplifier of claim 1, wherein the center frequency of the null is located in between 1002 MHz and 1100 MHz.

4. The RF signal amplifier of claim 3, wherein the power divider further includes an isolation circuit that is provided between the first output and the second output of the power divider that is configured to substantially block signals across the entire 5 MHz to 1002 MHz frequency band.

5. The RF signal amplifier of claim 4, wherein the first bypass circuit comprises a first bandpass/high pass filter that is configured to pass signals in the 1150 MHz to 1550 MHz frequency band.

6. The RF signal amplifier of claim 5, wherein the power divider further comprises:
    a second directional coupler that is coupled to the first output branch of the first directional coupler;
    a third directional coupler that is coupled to the second output branch of the first directional coupler;
    a second bandpass/high pass filter coupled between a first output branch and a second output branch of the second directional coupler; and
    a third bandpass/high pass filter coupled between a first output branch and a second output branch of the third directional coupler.

7. The RF signal amplifier of claim 6, further comprising:
    a fourth directional coupler that is coupled to the first output branch of the second directional coupler;
    a fifth directional coupler that is coupled to the second output branch of the second directional coupler;
    a sixth directional coupler that is coupled to the first output branch of the third directional coupler;
    a seventh directional coupler that is coupled to the second output branch of the third directional coupler;
    wherein the fourth through seventh directional couplers each include first and second output branches and wherein the fourth through seventh directional couplers do not include bandpass or high pass filters between their respective first and second output branches.

8. The RF signal amplifier of claim 7, wherein the power amplifier is part of a first communication path between the RF input port and the power divider, and wherein the RF signal amplifier further comprises a second non-amplified, non-interruptible communication path between the RF input port and a separate RF output port, and
    wherein the RF signal amplifier is configured to pass signals between an output of the power divider and the separate RF output port in the 1150 MHz to 1550 MHz frequency band.

9. The RF signal amplifier of claim 8, further comprising:
    a power input for receiving electrical power; and
    a selective termination circuit that is configured to pass signals between the RF input port and a plurality of RF output ports over the first communication path when electrical power is received at the power input, and that is further configured to terminate the first communication path to a matched termination when an electrical power feed to the power input is interrupted.

10. The RF signal amplifier of claim 9, wherein the selective termination circuit comprises a relay having an input terminal, a first output terminal and a second output terminal, wherein the first output terminal of the relay is coupled to the power amplifier and the second output terminal of the relay is connected to a resistor that is terminated to a ground voltage, the RF signal amplifier further comprising a directional coupler having an input that is connected to the RF input port, a first output that is connected to the input terminal of the relay and a second output that is connected to the second non-interruptible communication path.

11. The bi-directional RF signal amplifier of claim 9, wherein the power amplifier comprises a first power amplifier, and wherein the first communication path includes a forward path from the RF input port to the power divider and a reverse path from the power divider to the RF input port, and wherein the reverse path includes a second power amplifier, and wherein the first communication path further comprises a diplexer that is between the first output terminal of the relay and the first power amplifier and a triplexer that is between the first power amplifier and the power divider.

12. The RF signal amplifier of claim 1, further comprising a triplexer coupled between the power amplifier and the power divider, the triplexer including a filter that passes signals in at least part of the 1150 MHz to 1550 MHz frequency band.

13. The RF signal amplifier of claim 1, wherein the RF signal amplifier is further configured to pass signals in at least part of the 1150 MHz to 1550 MHz frequency band to the RF input port.

14. The RF signal amplifier of claim 1, wherein the center frequency of the null is located outside a pass band of the first bypass circuit.

15. An RF signal amplifier for a cable television network, comprising:
    an RF input port;
    a power amplifier coupled to the RF input port;
    a power divider network comprising:
        a first directional coupler coupled to an output of the power amplifier, the first directional coupler including an input, a first output and a second output; and
        a filter coupled between the first output and the second output of the first directional coupler, wherein the filter is configured to block signals in the 5 MHz to 1002 MHz frequency band and to pass signals in at least the 1150 MHz to 1550 MHz frequency band,
    wherein the power divider network blocks signals in at least a portion of the 870 MHz to 1150 MHz frequency band from passing from the input of the first directional coupler to either the first or second output of the first directional coupler.

16. The RF signal amplifier of claim 15, wherein the power divider network further includes a plurality of RF output ports, and wherein the power divider network further comprises:
    a second directional coupler that is coupled to the first output of the first directional coupler;
    a third directional coupler that is coupled to the second output of the first directional coupler;
    a second filter coupled between a first output and a second output of the second directional coupler that is configured to block signals in the 5 MHz to 1002 MHz frequency band and to pass signals in the 1150 MHz to 1550 MHz frequency band; and
    a third filter coupled between a first output and a second output of the third directional coupler that is configured to block signals in the 5 MHz to 1002 MHz frequency band and to pass signals in the 1150 MHz to 1550 MHz frequency band.

17. The RF signal amplifier of claim 16, wherein the power amplifier is part of a first communication path between the RF input port and the power divider network, and wherein the RF signal amplifier further comprises a second non-amplified, non-interruptible communication path between the RF input port and a separate RF output port.

18. The RF signal amplifier of claim 17, further comprising:
    a power input for receiving electrical power; and
    a selective termination circuit that is configured to pass signals between the RF input port and the plurality of RF output ports over the first communication path when electrical power is received at the power input and that is further configured to terminate the first communication path to a matched termination when an electrical power feed to the power input is interrupted.

19. A RF power divider network, comprising:
    an RF input port;
    a first directional coupler coupled to the RF input port, the first directional coupler including a first output and a second output;
    an isolation circuit provided between the first output and the second output of the first directional coupler that is configured to block signals in the 5 MHz to 1002 MHz frequency band; and
    a first bypass circuit coupled between the first and second outputs of the first directional coupler that is configured to pass signals in the 1150 MHz to 1550 MHz frequency band;
    a second directional coupler that is coupled to the first output of the first directional coupler;
    a third directional coupler that is coupled to the second output of the first directional coupler. a second bypass circuit coupled between the first and second outputs of the second directional coupler that is configured to pass signals in the 1150 MHz to 1550 MHz frequency band;
    a third bypass circuit coupled between the first and second outputs of the third directional coupler that is configured to pass signals in the 1150 MHz to 1550 MHz frequency band.
    a fourth directional coupler that is coupled to the first output of the second directional coupler;
    a fifth directional coupler that is coupled to the second output of the second directional coupler;
    a sixth directional coupler that is coupled to the first output of the third directional coupler;
    a seventh directional coupler that is coupled to the second output of the third directional coupler;
    wherein the fourth through seventh directional couplers do not include bypass circuits coupled between their respective first and second outputs.

20. An RF signal amplifier for a cable television network, comprising:
    an RF input port;
    a power divider network that includes at least first and second RF output ports;
    a first communication path between the RF input port and the power divider network;
    a second non-amplified, non-interruptible communication path between the RF input port and a third RF output port,
    a power input for receiving electrical power; and a selective termination circuit that is configured to pass signals between the RF input port and the power divider network over the first communication path when electrical power is received at the power input, and that is further configured to terminate the first communication path to a matched termination when an electrical power feed to the power input is interrupted, wherein the first communication path includes a forward path from the RF input port to the power divider network that includes a first power amplifier and a reverse path from the power divider network to the RF input port that includes a second power amplifier, a diplexer that is between the RF input port and the first power amplifier and a triplexer that is between the first power amplifier and the power divider network, and wherein the power divider network comprises at least
 a first directional coupler coupled to an output of the power amplifier, the first directional coupler including an input, a first output and a second output; and
 a filter coupled between the first output and the second output of the first directional coupler, wherein the filter is configured to block signals in the 5 MHz to 1002 MHz frequency band and to pass signals in at least the 1150 MHz to 1550 MHz frequency band,
 wherein the first directional coupler blocks signals in at least a portion of the 870 MHz to 1150 MHz frequency band from passing from the input of the directional coupler to either the first or second outputs of the directional coupler.

21. The RF signal amplifier of claim 20, wherein the selective termination circuit comprises a relay having an input terminal, a first output terminal and a second output terminal, wherein the first output terminal of the relay is coupled to the first power amplifier and the second output terminal of the relay is connected to a resistor that is terminated to a ground voltage, the RF signal amplifier further comprising a second directional coupler having an input that is connected to the RF input port, a first output that is connected to the input terminal of the relay and a second output that is connected to the second non-interruptible communication path.

22. The RF signal amplifier of claim 21, further comprising diplexer coupled between the RF input port and the second directional coupler.

* * * * *